United States Patent [19]

Soeda et al.

[11] Patent Number: 5,151,242
[45] Date of Patent: Sep. 29, 1992

[54] METHOD FOR VULCANIZING ELASTOMER PRODUCTS AND APPARATUS THEREFOR

[75] Inventors: Koji Soeda, Kobe; Yoshiya Kubota; Shoji Okamoto, both of Toyota; Akinori Kubota, Kobe; Michihito Kobayashi, Toyota; Masaaki Ijiri, Aichi; Nobuhiko Irie, Nagasaki; Akira Hasegawa, Nagasaki; Hideaki Katayama, Nagasaki; Toshifumi Murakami, Nagasaki; Katsuyoshi Sakaguchi, Nagasaki, all of Japan

[73] Assignees: Sumitomo Rubber Industries, Ltd., Hyogo; Mitsubishi Jukogyo Kabushiki Kaisha, Tokyo, both of Japan

[21] Appl. No.: 446,260

[22] Filed: Dec. 5, 1989

[30] Foreign Application Priority Data

Dec. 8, 1988 [JP] Japan ................................. 63-311332
Dec. 8, 1988 [JP] Japan ................................. 63-311333

[51] Int. Cl.⁵ ...................... B29C 35/04; B29D 30/00
[52] U.S. Cl. ..................................... 264/572; 264/85; 264/315; 264/326; 264/501; 425/38; 425/42; 425/50; 425/182; 425/387.1
[58] Field of Search ............... 264/315, 326, 36, 501, 264/85, 572; 425/36, 39, 40, 42, 50, 182, 387.1

[56] References Cited

U.S. PATENT DOCUMENTS

| | | | |
|---|---|---|---|
| 2,997,740 | 8/1961 | Soderquist . | |
| 3,443,280 | 5/1969 | Hugger | 425/36 |
| 4,752,212 | 2/1988 | Singh | 425/38 |
| 4,846,649 | 7/1989 | Hasegawa et al. . | |
| 5,020,982 | 6/1991 | Kubota et al. | 425/42 |

FOREIGN PATENT DOCUMENTS

| | | |
|---|---|---|
| 0323164 | 7/1989 | European Pat. Off. . |
| 56-28843 | 3/1981 | Japan . |
| 57-87349 | 5/1982 | Japan ................................. 425/39 |
| 57-185134 | 11/1982 | Japan . |
| 63-280604 | 11/1988 | Japan . |
| 2120967 | 12/1983 | United Kingdom . |

*Primary Examiner*—Jan H. Silbaugh
*Assistant Examiner*—Mathieu Vargot
*Attorney, Agent, or Firm*—Nikaido, Marmelstein, Murray & Oram

[57] ABSTRACT

A method and an apparatus for vulcanizing an elastomer product, such as automobile tires, wherein the elastomer product is placed in a vulcanizing chamber in a mold steam at an elevated pressure is supplied to the vulcanizing chamber to heat and pressurize the elastomer product until the elastomer product reaches a prespecified temperature or for a prespecified period of time, the steam supply is stopped and a pressurizing gas, at a pressure not lower than the steam supply pressure, is supplied to the vulcanizing chamber until the end of a heating period, said steam being blown in and supplied from an upper position of the center of the vulcanizing chamber in a horizontal direction or in an inclined downward direction, said steam being blown in and supplied from a lower position of the center of the vulcanizing chamber toward an upper region of the vulcanizing chamber. The method and apparatus prevent a large temperature difference within the elastomer product and provide uniform vulcanizing product uniformity, shortening of the vulcanizing time, improvement of productivity, and reduction of energy loss.

22 Claims, 18 Drawing Sheets

FIG.5
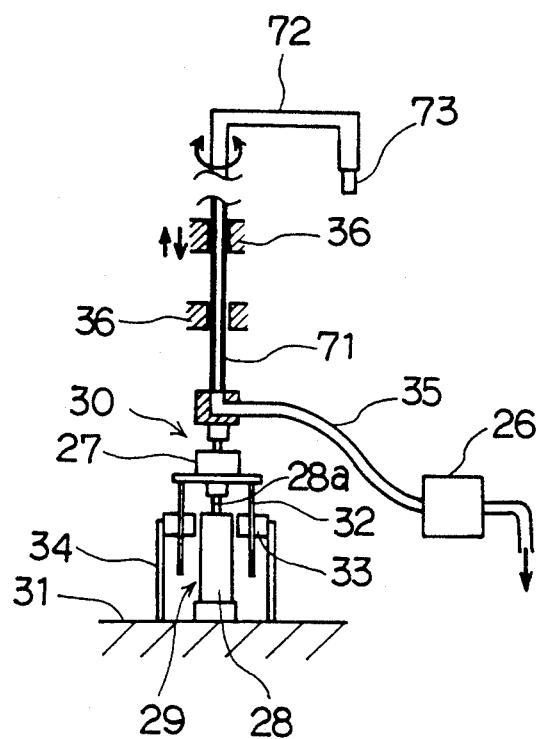
FIG.6A
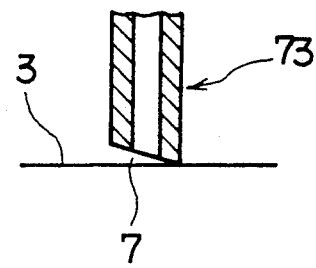
FIG.6BI
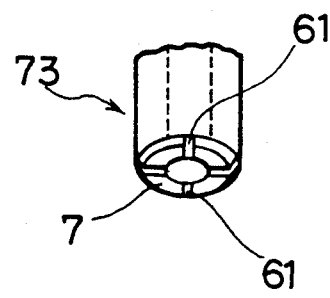
FIG.6BII
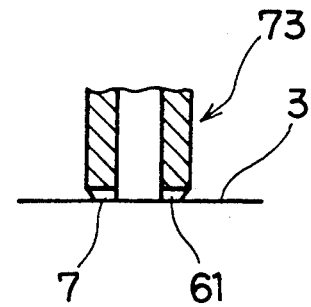

METHOD FOR VULCANIZING ELASTOMER PRODUCTS AND APPARATUS THEREFOR

BACKGROUND OF THE INVENTION

The present invention relates to a method for vulcanizing elastomer products and an apparatus used therefor.

Hitherto, as a method for vulcanizing elastomer articles, such as an automobile tire, with gas as a heat and pressure retaining medium as well as steam as a heating medium using a vulcanizing apparatus with a bladder, there has been employed a method, shown in FIG. 20, wherein an elastomer article (an automobile tire (b) in the example shown in the drawing) is placed in a mold (a), a bladder (c) is inflated by a supply of internal pressure for shaping. After the shape of the tire (b) becomes similar to the inside shape of the mold (a), the mold (a) is closed. Then, steam, as a heating medium, is blown in and supplied from a supply opening (e), which is formed at the center portion of the vulcanizing apparatus and communicates with a supply passage (d), along the horizontal direction from a lower position in the center of the vulcanizing chamber into an inner space (f) of the vulcanizing chamber, so that the tire (b) is heated and pressurized. When the temperature of the tire (b) reaches a prespecified temperature or after a prespecified period of time, the steam supply is stopped and then inert gas such as flue gas, nitrogen gas or the like as a pressurizing medium, at a pressure not lower than (not less than) the steam pressure, is blown in and supplied, until the remaining period in the heating step expires, along the horizontal direction from the same supply opening (e) or along the horizontal direction from another supply opening, which is formed for the pressurizing medium exclusively at the same height as the supply opening (e) for steam and communicates with the same or another supply passage, into the inner space (f) of the vulcanizing chamber, so that the temperature of the tire (b) is maintained at the prespecified temperature by the inert gas.

However, in the above-mentioned prior art apparatus, steam is blown from the lower position in the center of the vulcanizing chamber along the horizontal direction, and accordingly water, due to the condensation of steam, is accumulated in the lower portion of the bottom surface of the tire (b) without being discharged, and as a result, the heating of the lower sidewall is obstructed. An increase of internal pressure causes a decrease of steam inflow, and thereby internal steam flow is weakened. When the internal steam flow velocity is reduced to approximately zero, wet steam forms water droplets and falls downwardly, while other steam which maintains its superheated condition rises upwardly because of its relatively lower specific gravity. This results a temperature gradient along the vertical direction in the tire (b) Further, since the pressurizing gas (inert gas), having a lower temperature than the steam, is blown, the same as the steam, from a nozzle located at a lower position in the tire horizontally toward the lower portion of the tire, the portion to which the gas is directed (i.e. the lower bead portion and the like) is cooled to a lower temperature. Moreover, in a condition wherein the pressurizing gas inflow ceases due to an increase of the internal pressure and accordingly internal flow of the pressurizing gas ceases, the pressurizing gas having a higher specific gravity than steam is apt to accumulate in the lower portion of the inner space (f) of the tire and consequently the temperature of the lower portion, such as the lower sidewall and the lower bead portion, in contact with the pressurizing gas of the lower temperature is lowered.

On the other hand, the remaining steam accumulates in the upper portion of the inner space (f) and is subjected to adiabatic compression, although it only lasts for a short period, because of the pressurizing gas being introduced at a higher pressure, and therefore the steam temperature rises despite the lower temperature of the pressurizing gas and the upper sidewall is heated to a higher temperature.

Thus, in the inner space (f) of the tire, there are formed an upper layer (g) mainly comprising steam, a lower layer (h) mainly comprising the pressurizing gas, and a lowest bottom layer (i) of water of the steam condensate.

Accordingly, the inside temperature of the tire (b) changes as shown by imaginary lines in FIG. 7, FIG. 8, FIG. 14 and FIG. 15. That is, with regard to a point (A1) and a point (A2) at the upper bead portion of the tire, the temperature after the introduction of the pressurizing gas tends to rise as shown by the imaginary line 16, and the imaginary line 116 respectively, in FIG. 7 and FIG. 14, but on the contrary, with regard to a point (B1) and a point (B2) at the lower bead portion of the tire temperature after the introduction of the pressurizing gas tends to fall as shown by the imaginary line 15, and the imaginary line 115 respectively in FIG. 7 and FIG. 14. This results a large temperature difference $(T_{12})$ (e.g. 13° C.) between the point (A1) and the point (B1) and a large temperature difference $(T_{32})$ (e g. 13° C.) between point (A2) and the point (B2).

With regard to a point (C1) and a point (C2) at the upper sidewall of the tire, the temperature after the introduction of the pressurizing gas tends to rise as shown by the imaginary line 16a and the imaginary line 116a respectively in FIG. 8 and FIG. 14, but on the contrary, with regard to a point (D1) and a point (D2), at the lower sidewall of the tire, the temperature after the introduction of the pressurizing gas tends to stop rising as shown by the imaginary line 15a, and the imaginary line 115a respectively, in FIG. 8 and FIG. 15. This results a large temperature difference $(T_{22})$ (e.g. 12° C.) between the point (C1) and the point (D1) and a large temperature difference $(T_{42})$ (e.g. 12° C.) between the point (C2) and the point (D2).

Such a large temperature difference, which occurs in the above-mentioned manner, is not rectified completely by the time the vulcanizing operation is finished, and therefore, the upper sidewall and the lower sidewall of the tire (b) will have different degree of vulcanization from each other and this give rise to an undesirable problem in terms of the product quality. In addition, since the necessary cure time is decided according to the lower portions of the tire (b) where the speed of temperature rise is most retarded, a vulcanizing operation of longer duration has to be conducted and this is another undesirable problem also in terms of the productivity and energy saving.

The present invention was made in order to solve the above-mentioned problems, and an object of the present invention is to provide a method and an apparatus for vulcanizing elastomer article which does not cause an undesirable temperature difference inside of the elastomer article during the vulcanizing operation, enables uniform vulcanization to be carried out and accomplishes a reduction of energy loss.

SUMMARY OF THE INVENTION

In accordance with the present invention there is provided a method for vulcanizing elastomer articles (product) including: a heating step, wherein an elastomer article is placed in a vulcanizing chamber formed in a mold (1), a heating medium at a certain pressure is supplied to the vulcanizing chamber to heat and pressurize the elastomer article until the elastomer article reaches a prespecified temperature or for a prespecified period of time, the heating medium supply is stopped and inert gas as a pressurizing medium at a pressure not lower than the heating medium supply pressure, is supplied to the vulcanizing chamber until the end of the heating step, and a discharging step subsequent to the heating step wherein the heating medium and the pressurizing medium are discharged to end the vulcanizing, the heating medium being blown and supplied, from an upper position of the center of the vulcanizing chamber into the vulcanizing chamber along a horizontal direction, and the pressurizing medium being blown and supplied from a lower position of the center of the vulcanizing chamber toward an upper region of the vulcanizing chamber. In this method, it is preferable to employ a further feature wherein the heating medium is blown toward an equator of the elastomer article or its neighborhood along the horizontal direction, while the pressurizing medium is blown toward the upper region ranging from a portion above the center of the vulcanizing chamber to an upper sidewall portion of the elastomer article.

In another method of the present invention, the heating medium is blown and supplied from an upper position of the center of the vulcanizing chamber into the vulcanizing chamber along a horizontal direction, while the pressurizing medium is blown and supplied from a lower position of the center of the vulcanizing chamber toward an upper region of the vulcanizing chamber, and drain water accumulated in the bottom of the vulcanizing chamber due to condensation of the heating medium is forcedly discharged out of the elastomer article by means of a discharging means.

The present invention also provides a method wherein heating medium is blown in and supplied from an upper position of the center of the vulcanizing chamber toward a lower region of the vulcanizing chamber, while the pressurizing medium is blown in and supplied from a lower position of the center of the vulcanizing chamber toward an upper region of the vulcanizing chamber, and drain water accumulated in the bottom of the vulcanizing chamber due to condensation of the heating medium is forcedly discharged out of the elastomer article by means of a discharging means.

In accordance with the present invention there is provided an apparatus for vulcanizing an elastomer article wherein the elastomer article is placed in a vulcanizing chamber formed in a mold, a heating medium, at a certain pressure, is supplied to the vulcanizing chamber to heat and pressurize the elastomer article until the elastomer article reaches a prespecified temperature or for a prespecified period of time, the heating medium supply is stopped and inert gas, as a pressurizing medium at a pressure not lower than the heating medium supply pressure, is supplied to the vulcanizing chamber until the end of a heating period, and the temperature of the elastomer article is maintained at the prespecified temperature during the heating period, and further, there is formed a heating medium supply opening at an upper position of the center of the vulcanizing chamber for blowing the heating medium along a horizontal direction or toward a lower region of the vulcanizing chamber, and there is formed a pressurizing medium supply opening at a lower position of the center of the vulcanizing chamber for blowing the pressurizing medium toward an upper region of the vulcanizing chamber. In this apparatus, it is preferable to employ a further feature wherein the upper position of the center of the vulcanizing chamber is an upper bladder holder portion. It is also preferable that the lower position of the center of the vulcanizing chamber means a bugwell or a support of a lower bladder holder. It is also preferable that the heating medium supply openings are formed in a heating medium supply nozzle of a detachable type. It is also preferable that the pressurizing medium supply openings are formed in a pressurizing medium supply nozzle of a detachable type.

In another apparatus of the present invention, there is formed a heating medium supply opening at an upper position of the center of the vulcanizing chamber for blowing the heating medium along a horizontal direction or toward a lower region of the vulcanizing chamber, there is formed a pressurizing medium supply opening at a lower position of the center of the vulcanizing chamber for blowing the pressurizing medium toward an upper region of the vulcanizing chamber, and there is provided a discharging means for forceably discharging drain water accumulated in the bottom of the vulcanizing chamber due to condensation of the heating medium out of the elastomer article. In this apparatus, it is preferable to employ a feature, wherein the heating medium supply openings are formed in a heating medium supply nozzle of a detachable type. It is also preferable that the pressurizing medium supply openings are formed in a pressurizing medium supply nozzle of a detachable type.

In the above-mentioned methods and apparatuses, the high temperature heating medium (such as steam) is blown horizontally from an upper position of the center of the valcanizing chamber, for example horizontally from the upper bladder holder portion toward the tire equator or its neighborhood, and therefore the upper half and the lower half of the tire are uniformly blown by a steam jet and therefore uniform heating can be carried out.

In addition, drain water (accumulated in the bottom of the vulcanizing chamber (i.e. in the inside concave portion of the lower sidewall) is forcedly discharged out by the drain discharging means in the vulcanizing operation, so that there is prevented a drainwater accumulation which can obstruct the contact between the lower sidewall and high temperature steam and consequently obstructs the heating up of the lower sidewall. Thus the slowdown in heating of the lower sidewall is prevented from occurring and the difference in heating condition between regions inside the tire is sharply reduced.

Further, by blowing the pressurizing medium (gas) upwardly, for example toward the upper sidewall portion or its neighborhood, the low temperature pressurizing gas stream is directed along an inclined upward direction to the relatively high temperature steam accumulated locally in the upper portion after the steam inflow into the tire has been reduced. Thus, a vertically circulating mixing flow against the steam is generated by the pressurizing medium jet without causing the adiadatic compression of the steam. Accordingly, the local accumulation of high pressure the steam is rectified, an effective cooling is achieved with regard to the upper portion of the tire, which has been at relatively high temperature, and the temperatures of the upper portion and the lower portion become uniform with each other.

Further, where a supply nozzle of a detachable type is employed, the replacement of the supply nozzle makes it possible to change the blowing direction of the heating medium and/or the pressurizing medium. Thus the heating medium and the pressurizing medium can be blown and supplied in their respective optimum directions and at the respective optimum angles according to the size and the shape of the elastomer article in order to obtain the most desirable result.

In accordance with the present invention, there is also provided a method an vulcanizing elastomer article including a heating step wherein an elastomer article is placed in a vulcanizing chamber formed in a mold (1), a heating medium at a certain pressure is supplied to the vulcanizing chamber to heat and pressurize the elastomer article until the elastomer article reaches a prespecified temperature or for a prespecified period of time, the heating medium supply is stopped and inert gas as a pressurizing medium at a pressure not lower than the heating medium supply pressure is supplied to the vulcanizing chamber until the end of the heating step, and a discharging step subsequent to the heating step wherein the heating medium and the pressurizing medium are discharged to end the vulcanizing, the heating medium being blown in and supplied from an upper position of the center of the vulcanizing chamber toward a lower region of the vulcanizing chamber, the pressurizing medium being blown in and supplied from a lower position of the center of the vulcanizing chamber toward an upper region of the vulcanizing chamber. In this method, it is preferable to employ a further feature wherein the said upper position of the center of the vulcanizing chamber means an upper bladder holder portion.

It is also preferable that the heating medium is blown toward the lower region ranging from the equator of the elastomer article or its neighborhood toward a lower sidewall or its neighborhood, and the pressurizing medium is blown toward the upper region ranging from a portion above the center of the vulcanizing chamber to an upper sidewall portion of the elastomer article.

The present invention also provides a method for vulcanizing an elastomer article including a heating step wherein the elastomer article is placed in a vulcanizing chamber formed in a mold (1), a heating medium at a certain pressure is supplied to the vulcanizing chamber to heat and pressurize the elastomer article until the elastomer article reaches a prespecified temperature or for a prespecified period of time, the heating medium supply is stopped and inert gas as a pressurizing medium at a pressure not lower than the heating medium supply pressure is supplied to the vulcanizing chamber until the end of the heating step, and a discharging step subsequent to the heating step wherein the heating medium and the pressurizing medium are discharged to end the vulcanizing, the pressurizing medium being blown and supplied from a lower position of the center of the vulcanizing chamber toward an upper region of the vulcanizing chamber.

In accordance with the present invention, there is also provided an apparatus for vulcanizing an elastomer article including a heating step wherein an elastomer article is placed in a vulcanizing chamber formed in a mold (1), a heating medium at a certain pressure is supplied to the vulcanizing chamber to heat and pressurize the elastomer article until the elastomer article reaches a prespecified temperature or for a prespecified period of time, the heating medium supply is stopped and inert gas as a pressurizing medium at a pressure not lower than the heating medium supply pressure is supplied to the vulcanizing chamber until the end of a heating period, and the temperature of the elastomer article is maintained at the prespecified temperature during the heating period and further, there is formed a heating medium supply opening at an upper position of the center of the vulcanizing chamber for blowing the heating medium toward a lower region of the vulcanizing chamber, and there is formed a pressurizing medium supply opening at a lower position of the center of the vulcanizing chamber for blowing the pressurizing medium toward an upper region of the vulcanizing chamber. In this apparatus, it is preferable to employ a further feature wherein the upper position of the center of the vulcanizing chamber means is an upper bladder holder portion. It is also preferable that the lower position of the center of the vulcanizing chamber means is bagwell or a support of a lower bladder holder. It is also preferable that the heating medium supply openings are formed in a heating medium supply nozzle of a detachable type. It is also preferable that the pressurizing medium supply openings are formed in a pressurizing medium supply nozzle of a detachable type.

In the above-mentioned methods and apparatuses, the high temperature heating medium (such as steam) is blown downwardly from an upper position of the center of the valcanizing chamber, for example from the upper bladder holder portion, toward the lower region ranging from the tire equator or its neighborhood to the lower sidewall or its neighborhood. With respect to the jet of the heating medium blown downwardly toward the tire equator, for example, major part thereof flows along the inside shape of the tire, that is, from the tire equator or its neighborhood through the lower sidewall toward the lower bead portion, and accordingly the heating medium pushes the accumulated drain in the bottom of the inside of the tire to discharge it from inside to outside of the tire. On the other hand, with respect to the jet of the heating medium blown downwardly toward the lower sidewall or its neighborhood, for example, the jet acts in such a manner that it blows off and pushes away the accumulated drain. Thus, the slowdown in heating of the lower sidewall due to the presence of the accumulated drain in the tire bottom can be prevented from occurring.

Further, as mentioned above by blowing the pressurizing medium (gas) upwardly, for example toward the upper sidewall portion or its neighborhood, the low temperature pressurizing gas stream is directed along an inclined upward direction to the relatively high temperature steam accumulated locally in the upper portion because of the vertical temperature gradient in the tire. Thus, a vertically circulating mixing flow against the steam is generated by the pressurizing medium jet without causing the adiabatic compression of the steam. Accordingly, the local accumulation of the steam is rectified and the temperature gradient in the tire is rectified. An effective cooling is achieved with regard to the upper portion of the tire which has been at relatively high temperature due to the local presence of the high temperature steam and the temperature gradient in the tire, and the temperatures of the upper portion and the lower portion become uniform with each other.

Further, in case that the supply nozzle of a detachable type is employed, the replacement of the supply nozzle makes it possible to change the blowing direction of the heating medium and/or the pressurizing medium. Thus, the heating medium and the pressurizing medium can be blown and supplied in the respective optimum directions and at the respective optimum angles according to the size and the shape of the elastomer article in order to obtain the most desirable result.

The upper position, from which the heating medium is supplied, means in a sectional view a position within a range upwardly extending from the equator (the middle) of the tire placed in the mold, and the lower position, from which the pressurizing medium is supplied, means in a sectional view a position within a range downwardly extending from the equator (the middle) of the tire placed in the mold.

BRIEF DESCRIPTION OF THE DRAWINGS

The features and advantages of the present invention will be more clearly appreciated from the accompanying drawings, in which:

FIG. 5 is a schematic view showing an up-down and rotation mechanism;

FIG. 6A is an enlarged sectional view showing a major part of an embodiment of a slender pipe in a drain discharging mechanism;

FIGS. 6BI to 6BII show another embodiment of a slender pipe wherein FIG. 6BI is an enlarged perspective view showing a major part and FIG. 6BII is an enlarged sectional view showing the same major part;

DETAILED DESCRIPTION

Figure 1:
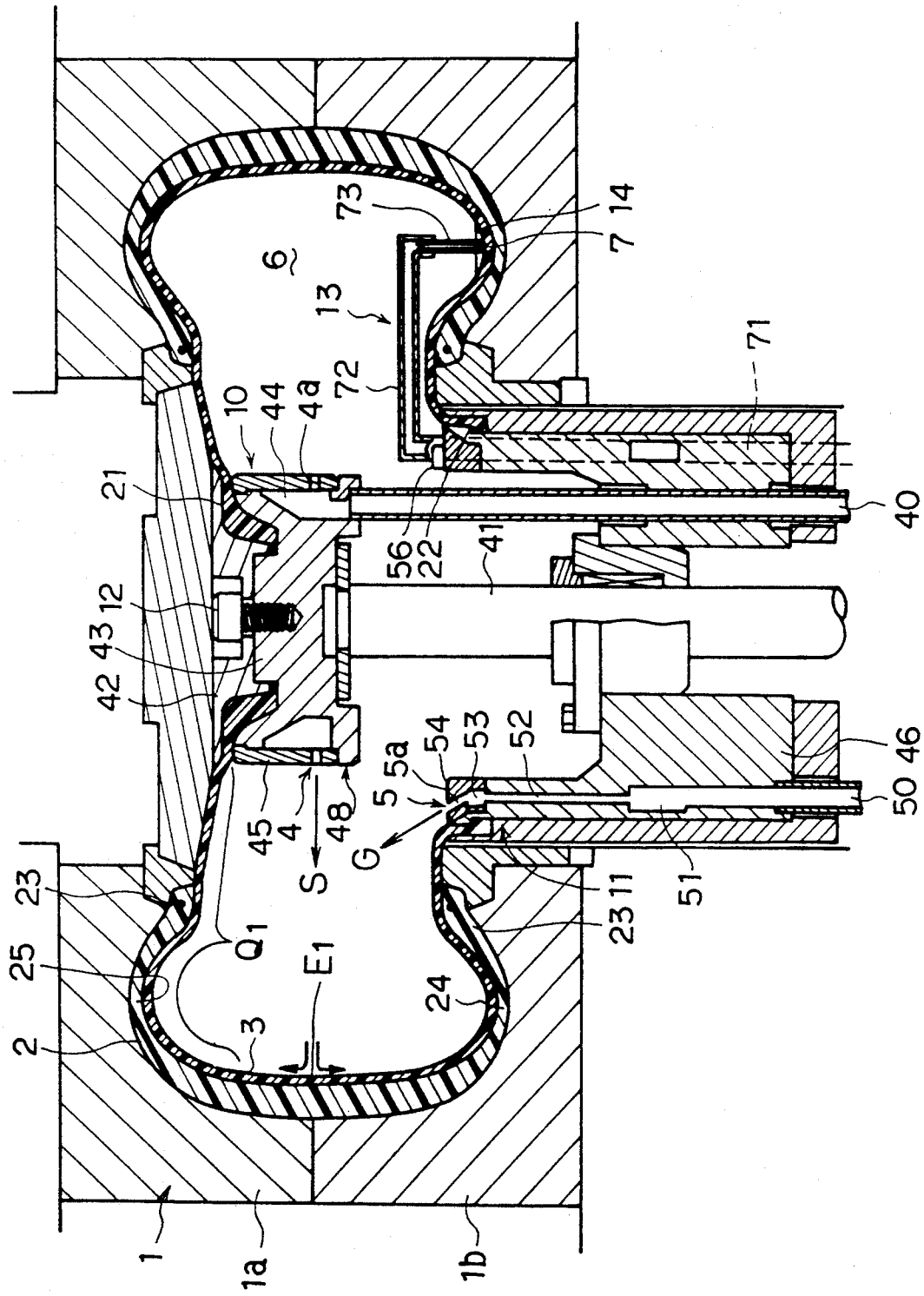
FIG. 1 is a sectional view showing an embodiment of the vulcanizing apparatus of the present invention.

Hereinafter there are explained specific embodiments referring to the drawings.

FIG. 1 shows a vulcanizing apparatus of the present invention of a so-called rolling-in-bladder type for a tire which is a typical example of the elastomer article. With respect to the mold and the central mechanism of the vulcanizing chamber, the apparatus of FIG. 1 employs approximately similar construction to that of the publicly known prior art apparatus. However, the apparatus of FIG. 1 is different from the prior art apparatus in the particular construction of the supply means for steam and pressurizing gas and in the construction equipped with a drain discharging mechanism, as explained below. That is, in the apparatus of FIG. 1, a green tire is placed in a vulcanizing chamber formed in a mold 1, internal pressure for shaping is supplied into a bladder 3, an upper inner end 21 of which is held by an upper bladder holder portion 10 while a lower inner end 22 thereof is held by a lower bladder holder portion 11, so that the green tire 2 is shaped so as to lie near and along the inside surface of the mold 1 and the shape of the green tire 2 becomes similar to the inside shape of the mold 1. Then the mold 1 is closed and a heating medium such as steam is supplied into the bladder 3 in order to heat and pressurize the green tire 2. When the temperature of the green tire 2 reaches a prespecified temperature or after a prespecified period of time expires, the supply of the heating medium is stopped and then a pressurizing medium such as nitrogen gas at a pressure not lower than the pressure of the heating medium, is supplied until the end of the heating stage into the bladder 3, so that the temperature of the green tire 2 is maintained at the preselected temperature to complete the vulcanizing.

The mold 1 comprises an upper mold 1a and a lower mold 1b.

The upper bladder holder portion 10 is located at the upper end of a center post 41, i.e. at the upper position of the center of the vulcanizing chamber, and comprises a ring 42, a block 43 and a heating medium supply nozzle 45 attached to the block 43. The ring 42 and the block 43 form an upper clamp ring 48, and the ring 42 and the block 43 are fastened by means of a bolt 12 with the upper inner end 21 of the bladder 3 being nipped and held therebetween.

Figure 3A:
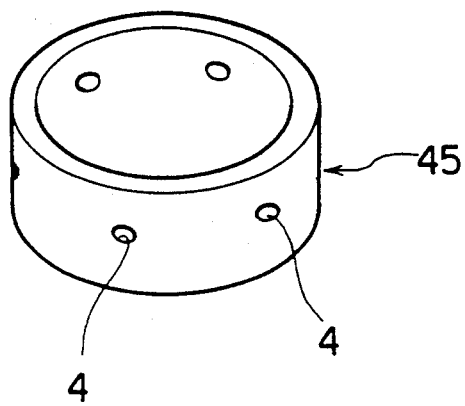
FIG. 3A is a schematic perspective view of a heating medium supply nozzle usable in the present invention.

The heating medium supply nozzle 45 has a ring shape as shown in FIG. 3A, and is set removably in the block 43 to form an annular space 44 between the block 43 and the nozzle 45 itself. The heating medium supply nozzle 45 has a plurality of heating medium supply openings 4 to make the annular space 44 communicate with the vulcanizing chamber 6. A plurality of heating medium supply openings 4 are disposed at prespecified intervals along the circumferential direction. The direction, number and diameter of the heating medium supply openings 4 are selected conformably with the tire size.

A heating medium supply passage 40 is connected to the block 43 on one side to allow the heating medium such as steam to flow into the annular space 44, and on the other side of the hating medium supply passage 40 is passed through a bugwell 46 and connected to a heating medium supply source omitted in the drawing. Thus the heating medium out of the supply passage 40 flows through the annular space 44 means blows horizontally from the heating medium supply openings 4 into the vulcanizing chamber. There are normally prepared two or more supply nozzles 45 having the supply openings 4 horizontally directed to the equator (E1) or its neighborhood on inside of the tire.

Therefore, a jet of, for example, steam evenly contacts the upper half and the lower half of the tire, and uniform heating can be carried out.

Figure 3B:
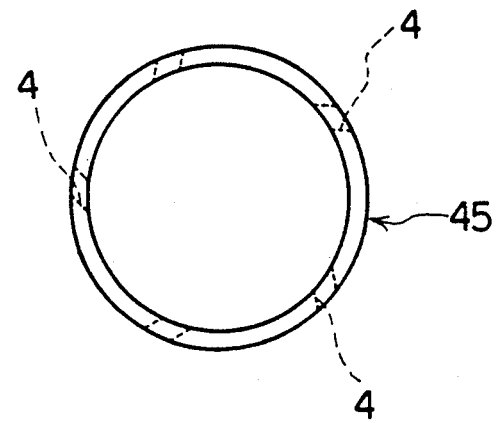
FIG. 3B is a schematic plan view of the nozzle of FIG. 3A.

In addition, a supply path 4a of the heating medium supply opening 4 is inclined relative to the radial direction as shown in FIG. 3B, and therefore the heating medium emitted from the supply opening 4 circularly flows along the circumferential direction.

With respect to the location of the heating medium supply passage 40, although it is located outside of the center post 41 in the embodiment shown in FIG. 1, it may alternatively be located inside of the center post 41.

Figure 2:
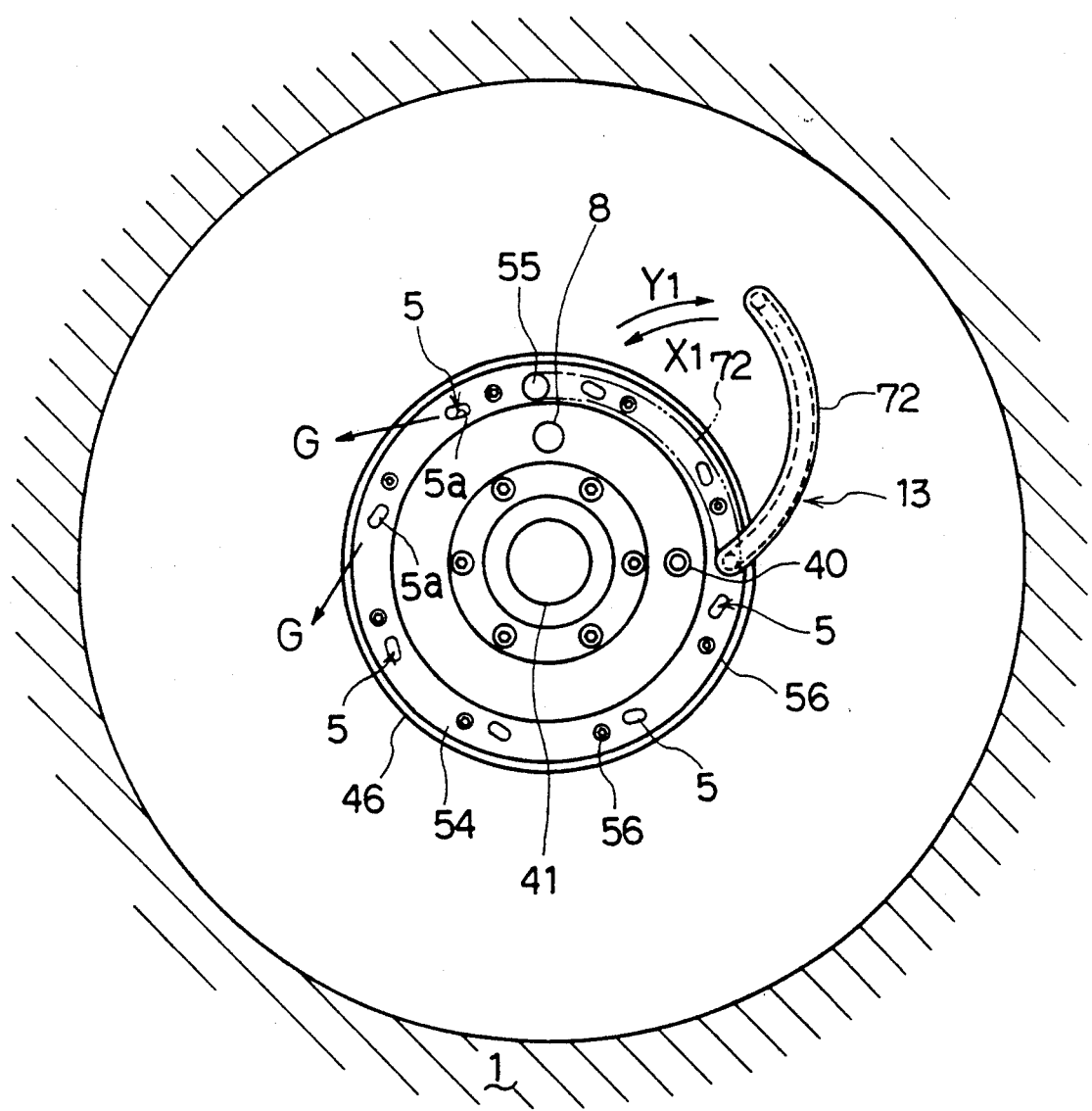
FIG. 2 is a sectional plan view showing the embodiment of FIG. 1.

In the bugwell 46 a pressurizing medium supply passage 50 is formed for supplying inert gas such as nitrogen gas, and connects and communicates with an annular relay chamber 51 internally formed in the bugwell 46. The annular relay chamber 51 further connects and communicates with the plurality of branch passages 52 disposed at predetermined intervals along the circumferential direction. At the upper open ends of the branch passages 52, a pressurizing medium supply nozzle 54 is removably fastened by bolts 56 to the upper end of the bugwell. The pressurizing medium supply nozzle 54 has a plurality of pressurizing medium supply openings 5 to make the branch passages 52 communicate with the vulcanizing chamber. As shown in FIG. 2, the pressurizing medium supply openings 5 are disposed at predetermined intervals along the circumferential direction. Thus the pressurizing medium from the supply passage 50 flows through the annular relay chamber 51 into the plurality of the branch passage 52 and blows from the supply openings 5 toward the upper region of the vulcanizing chamber.

Figure 4A:
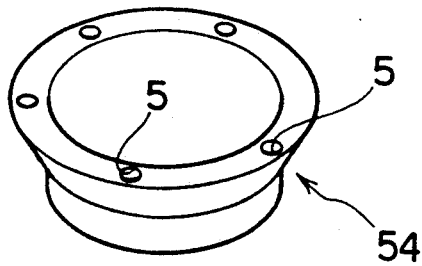
FIG. 4A is a schematic perspective view of a pressurizing medium supply nozzle usable in the present invention.
Figure 4B:
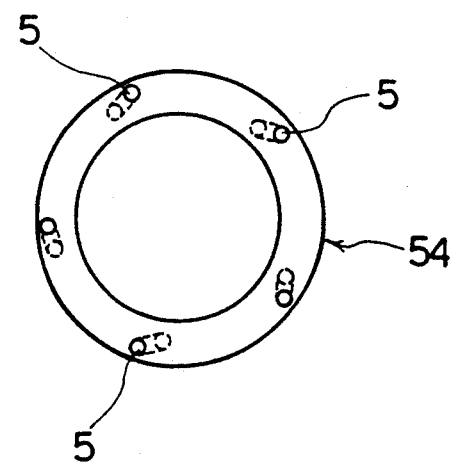
FIG. 4B is a schematic plan view of the nozzle of FIG. 4A.

The pressurizing medium supply nozzle 54 has a ring shape as shown in FIG. 2 and FIGS. 4A to 4B, and there are normally prepared two or more supply nozzles 54 having the supply openings 5 upwardly directed toward a desirable part within a region (Q1) ranging from a portion above the center of the vulcanizing chamber to the upper sidewall 25 of the tire 2.

In the embodiment shown in FIG. 1, the pressurizing medium supply opening 5 is directed to the upper sidewall 25 or its neighborhood, and therefore in this case, the pressurizing medium blows, as shown by an arrow in FIG. 1, along inclined upward direction across the inner space 6 of the tire.

Thus the pressurizing medium (gas) is blown and supplied from the lower position of the center of the vulcanizing chamber toward the upper region of the vulcanizing chamber, and accordingly a long flowing distance of the gas stream across the inner space 6 of the tire is permitted so that the mixing effect with the heating medium such as steam is enhanced and the temperature difference within the inner space 6 of the tire is rectified.

In this connection, a supply path 5a for pressurizing medium is inclined relative to the radial direction as shown in FIG. 4B, and therefore the heating medium emitted from the supply opening 5 circularly flows along the circumferential direction.

An embodiment may optionally have an additional drain discharging mechanism 13 in combination with the construction of the above-mentioned embodiment (in which the heating medium is blown horizontally from the upper position of the center of the vulcanizing chamber while the pressurizing medium is blown upwardly from the lower position of the center of the vulcanizing chamber). The drain discharging mechanism 13 comprises a pipe 71 which is inserted into the bugwell 46 and serves as a discharging passage, an arcuate pivot arm 72 which connects and communicates with the pipe 71 and has an internally formed passage, and a slender pipe 73 which connects and communicates with the end of the pivot arm 72 and located at the bottom of the vulcanizing chamber (at the lower sidewall of the tire). The pipe 71 is attached to the bugwall in such a manner that as shown in FIG. 5 the pipe 71 is allowed to move upwardly and downwardly by virtue of an up-down mechanism 29 having an air cylinder 28 etc. and also allowed to move pivotally by virtue of an rotation mechanism 30 having a rotary actuator 27 etc.. That is, the pivot arm 72 can pivotally move as indicated by arrows (X1) and (Y2) shown in FIG. 2, and can also make up-down movement. Therefore, the pivot arm 72 is overhung from the bugwell 46 into the vulcanizing chamber during vulcanizing operation as indicated by a solid line in FIG. 2, on the other hand before or after vulcanizing operation the pivot arm 72 is rested on the bugwell 46 as indicated by an imaginary line in FIG. 2. When the pivot arm 72 is rested, the slender pipe 73 is housed in a sheath hole 55 formed in the bugwell 46.

There is explained here in detail the operation to bring the pivot arm 72 from a state indicated by the solid line in FIG. 2 (i.e. the state shown in FIG. 1) to another state indicated by the imaginary line in FIG. 2. First the pipe 71 is upwardly moved by means of the up-down mechanism 29, then the pipe 71 is rotated by means of the rotation mechanism 30 to pivotally move the pivot arm 72 along the direction of the arrow (X1) until the slender pipe 73 comes to a position right above the sheath hole 55, and finally the pipe 71 is downwardly moved by means of the up-down mechanism 29 to allow the slender pipe 73 to be inserted into the sheath hole 55. When it is intended to bring the pivot arm 72 from the state of the imaginary line to the state of the solid line, the above-mentioned operation is conducted in the reverse order.

The up-down mechanism 29 and the rotation mechanism 30 are concretely indicated in FIG. 5, in which, the bottom end of the pipe 71 is connected to the rotary actuator 27, the rotary actuator 27 is connected to a rod 28a of the air cylinder 28, and the air cylinder 28 is vertically mounted on a lower frame 31 of a press. The numeral 32 indicates an anti-rotation rod, the numeral 33 indicates a sliding bearing through which the anti-rotation rod 32 passes slidably, and the numeral 34 is a support for the sliding bearing 33 and vertically mounted on the lower frame 31 of the press.

The bottom end of the pipe 71 also connects and communicates with a flexible hose 35 which connects with a trap 26.

The numeral 36 indicates a part of the lower frame of the press which supports the pipe 71 slidably and rotatably.

In the embodiments having the above-mentioned drain discharging mechanism 13 as shown in FIG. 1, the accumulated drain 14 is pushed by the pressure of the inner space 6 of the tire, and forcedly discharged out of the tire through the slender pipe 73, the internally formed passage of the pivot arm 72, the pipe 71, the flexible hose 35 and the steam trap 26. The drain discharging mechanism 13 can optionally be connected to a vacuum mechanism so that the accumulated drain can be sucked out.

The numeral 8 in FIG. 2 indicates an outlet opening for drain, gas and the like.

There is explained next a vulcanizing method of the present invention for a tire as a typical elastomer article.

First, a tire 2 is placed surrounding the outer peripheral surface of a deflated bladder 3. Then, with a mold 1 being closed, a shaping medium is supplied through a pipe omitted in the drawing to inflate the bladder 3 until the shape of the tire 2 becomes similar to the inside shape of the mold 1 and lies near and along the inside of the mold 1, and the bladder 3 and the tire 2 are brought into close contact with each other.

Then the mold 1 is completely closed and steam at 15 kg/cm$^2$ is introduced into a heating medium supply passage 40 in order to supply the steam for 5 minutes from a heating medium supply opening 4 located at the upper position of the center of the apparatus to a vulcanizing chamber (i.e. an inner space 6 within the bladder 3). The steam out of the supply opening 4 is supplied horizontally as indicated by the arrow in FIG. 1 and blown toward the equator (E1) evenly relative to the upperside and the lowerside. This steam supply provides heating of the tire 2 to a temperature required to proceed vulcanization reaction, for example about 180° C.

Then a pressurizing gas at a lower temperature near the room temperature (e.g. 40° C.) and a pressure of 18 kg/cm$^2$ is introduced to a pressurizing medium supply passage 50 in order to supply the pressurizing gas for 5 minutes upwardly from a pressurizing medium supply opening 5 into the inner space 6. The gas out of the supply opening 5 is supplied upwardly and provides cooling and mixing for the upper portion of the inner space 6, then the gas gradually flows downwardly and is mixed with the remaining steam.

Thus, by the cooling effect and the mixing effect occurring in the upper portion within the tire 2 by virtue of the upward stream of the pressurizing gas in combination with the even steam flow relative to the upperside and the lowerside, large temperature difference between the upper portion and the lower portion in the inner space 6 is prevented from occurring, and large local temperature rise in the upper portion due to upward adiabatic compression of steam in the tire as observed in the prior art method is also prevented from occurring. Further, insufficient heating of the lower bead portion 23 is also prevented.

In case that an apparatus having a drain discharging mechanism 13 is used, upon completion of the close contact by pressing between the inner surface of the tire 2 and the bladder, a pipe 71 of the drain discharging mechanism 13 is raised by a small distance by means of an up-down mechanism. Then a pivot arm 72 is rotated along a direction indicated by an arrow (Y1) in FIG. 2 by means of a rotation mechanism, and thereafter, the pipe 71 is downwardly moved by means of the up-down mechanism, so that the pivot arm 72 is overhung from the bugwell 46 into the vulcanizing chamber and concurrently a bottom open end 7 of a slender pipe 73 is located close to the bladder surface at the lower sidewall 24 of the tire 2. Thus, accumulated drain 14 in the bottom portion of the tire 2 due to condensation of steam, which is indicated in FIG. 1, is pushed by the internal pressure of the tire 2 and forcedly discharged out of the tire through the slender pipe 73, the pivot arm 72, the pipe 71, a flexible hose 35 and a steam trap 26.

The steam trap 26 prevents the internal pressure of the tire 2 from escaping.

Because the accumulated drain water 14 obstructs the contact between the surface of the lower sidewall and the high temperature steam and consequently obstructs the heating of the lower sidewall, the discharging of the accumulated drain water 14 sharply minimizes the difference in heating condition in the tire 2. Further in combination with the optimization of the supply direction of the heating medium, the heating of the tire is carried out uniformly. Moreover in combination additionally with the upward supply of the pressurizing medium, the uniformity of the temperature in the tire 2 during vulcanization is sharply improved.

In order to allow the accumulated drain water 14 to flow into the slender pipe 73 even in case that the bottom open end 7 of the slender pipe 73 is in contact with the surface of the bladder 3, the bottom open end 7 may have an inclined end surface as shown in FIG. 6A or plurality of ditches 61 as shown in FIGS. 6BI to 6BII. An example of the ditch 61 is a radial ditch which makes the bore of the slender pipe 73 communicate with the outside.

After the vulcanizing operation is completed a valve in an outlet pipe omitted in the drawing is opened to discharge the mixture of gas and steam out of the inner space 6 via the outlet pipe. Thereafter, the pipe 71 of the drain discharging mechanism 13 is moved upwardly, the pivot arm 72 is rotated along the direction of the arrow (X1) in FIG. 2, and then the pipe 71 is moved downwardly to be rested as illustrated by the imaginary line in FIG. 2. Subsequently, the above-mentioned valve is closed with another valve opened, the center post 41, the bugwell 46 and the lower bladder holder portion 11 are moved downwardly to remove the bladder 3 from the inside of the tire 2, the mold 1 is opened, and the vulcanized tire is taken out of the mold 1.

It is matter of course that the so-called bladderless vulcanization does not have the above-mentioned bladder removal step.

In the drawings the symbol (S) indicates steam as a heating medium and the symbol (G) indicates gas as a pressurizing medium.

Figure 7:
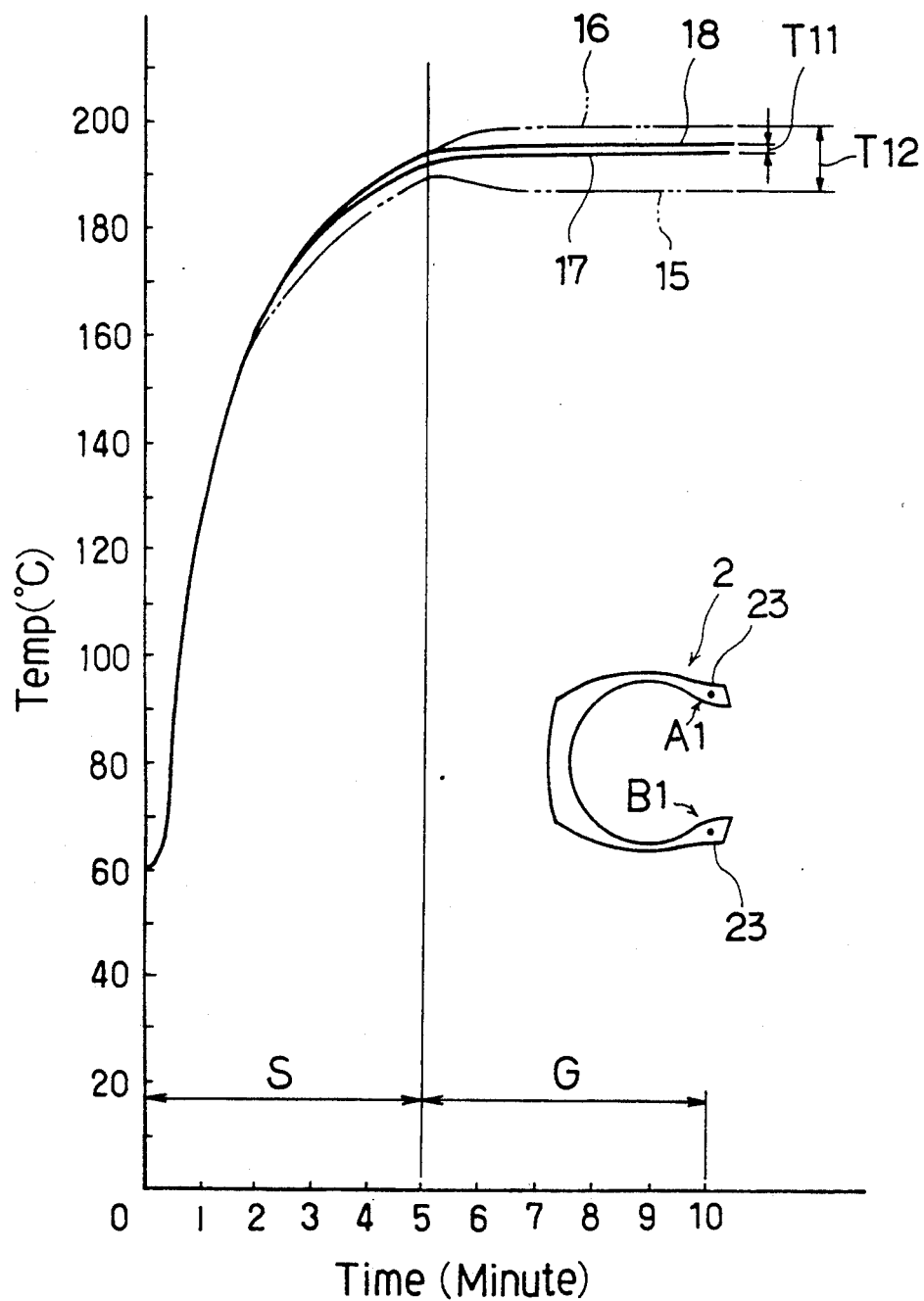
FIGS. 7 to 8 are graphs each of which shows an example temperature difference in an elastomer article.

FIG. 7 shows a temperature difference between a point (A1) at the bead portion 23 on the upperside and a point (B1) at the bead portion 23 on the lowerside of the tire 2 which is subjected to the vulcanization using the apparatus shown in FIG. 1. The temperature of the point (A1) after the introduction of the pressurizing gas exhibits a behavior indicated by a solid line 18, the temperature of the point (B1) after the introduction of the pressurizing gas exhibits a behavior indicated by a solid line 17, and the temperature difference ($T_{11}$) between the point (A1) and the point (B1) is about 2° C.

Figure 8:
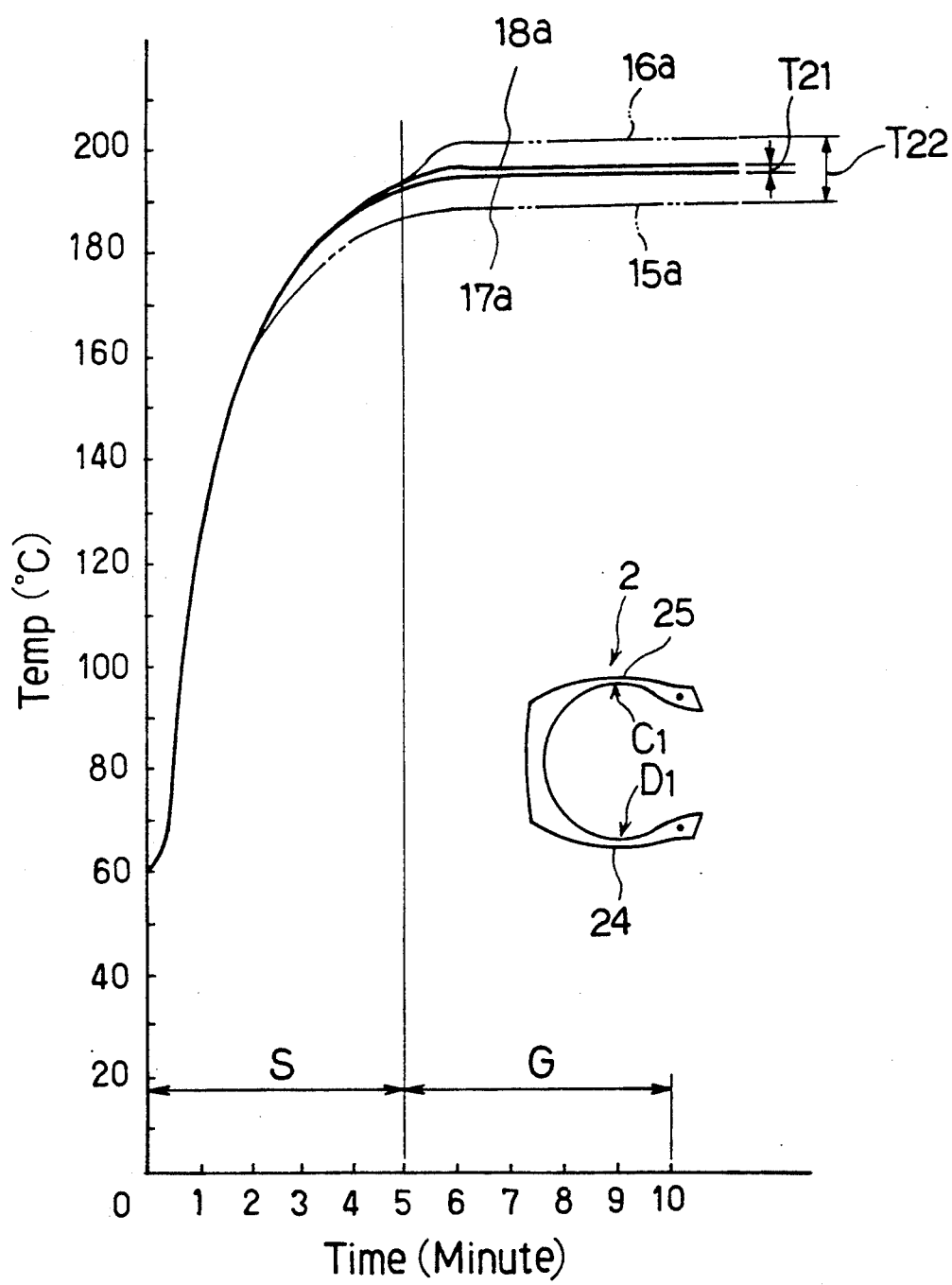

FIG. 8 shows a temperature difference between a point (C1) at the upper sidewall 25 and a point (D1) at the lower sidewall 24 of the tire 2 which is subjected to the vulcanization using the apparatus shown in FIG. 1. The temperature of the point (C1) after the introduction of the pressurizing gas exhibits a behavior indicated by a solid line 18a, the temperature of the point (D1) after the introduction of the pressurizing gas exhibits a behavior indicated by a solid line 17a, and the temperature difference ($T_{12}$) between the point (C1) and the point (D1) is about −2° C.

As described hereinbefore, the most desirable way to provide heating evenly relative to the upperside and the lowerside is to supply the heating medium horizontally toward the equator of the vulcanizing chamber. However, in case that the duration period of the heating medium introduction is required to be set relatively longer such as the case that the thickness of the elastomer article is relatively larger, a large temperature difference between the upperside and the lowerside still can occur particularly in the late stage in the heating medium introduction operation. Therefore, in some case it might be necessary to employ another method described below in order to compensate or correct the above-mentioned temperature difference.

There are explained hereinafter embodiments thereof.

Figure 9:
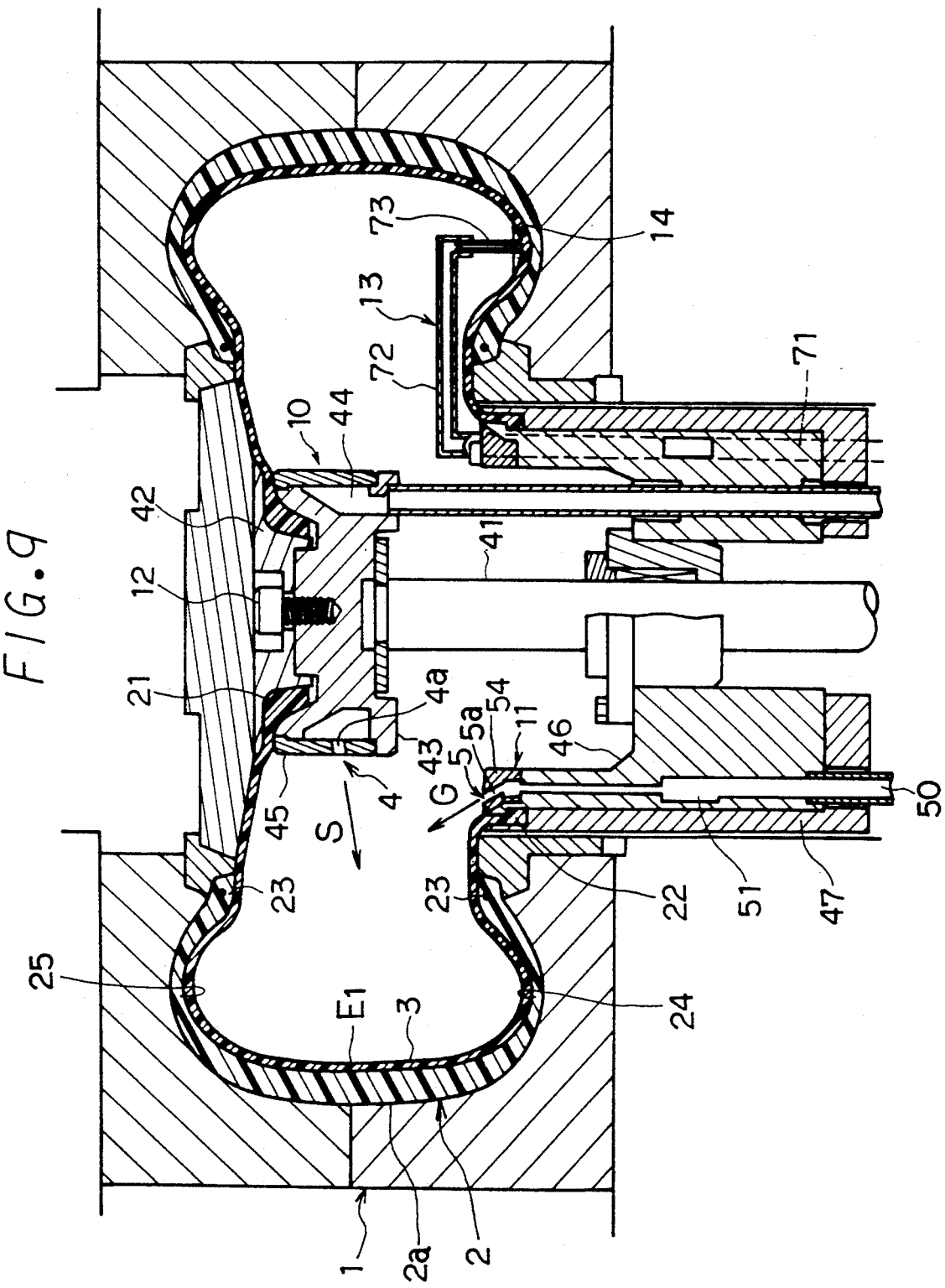
FIGS. 9 to 11 are sectional views each of which shows a different embodiment.

FIG. 9 shows another embodiment particularly applied to a low aspect ratio tire.

The low aspect ratio tire has a maximum sectional width which is larger than its sectional height, and accordingly the tread width is large and the distance between the upper sidewall 25 and the lower sidewall 24 is large.

If there is employed the apparatus in which the heating medium is supplied horizontally as shown in FIG. 1, then a direct heating effect at the upper sidewall 25 and the lower sidewall 24 by steam injection becomes small and an increase of internal pressure causes a reduction of steam flow velocity. When the flow velocity of gaseous steam in the vulcanizing chamber approaches to approximately zero, as previously mentioned, wet steam which has lost its enthalpy falls downwardly while the rest which maintains the superheated condition rises upwardly. In case of a tire having a large dimension along the vertical direction (i.e. along the sectional width), the temperature gradient along the vertical direction inside the tire is particularly enhanced.

In that case, there can be employed a method and an apparatus as shown in FIG. 9 wherein the heating medium (steam) is supplied from the upper position of the center of the vulcanizing chamber downwardly to the equator (E1) or its neighborhood, so that the steam distribution toward the lower sidewall 24 can be increased to rectify the effect of the temperature gradient, and the temperature difference along the vertical direction becomes smaller.

Also in this case, the previously mentioned water discharging mechanism can preferably be employed in combination with the above-mentioned construction, so that the accumulated drain water in the bottom of the vulcanizing chamber is forcedly discharged. Because this embodiment is almost similar to the embodiment of FIG. 1 except for the steam supply direction mentioned above, a further explanation therefor is omitted.

Figure 10:
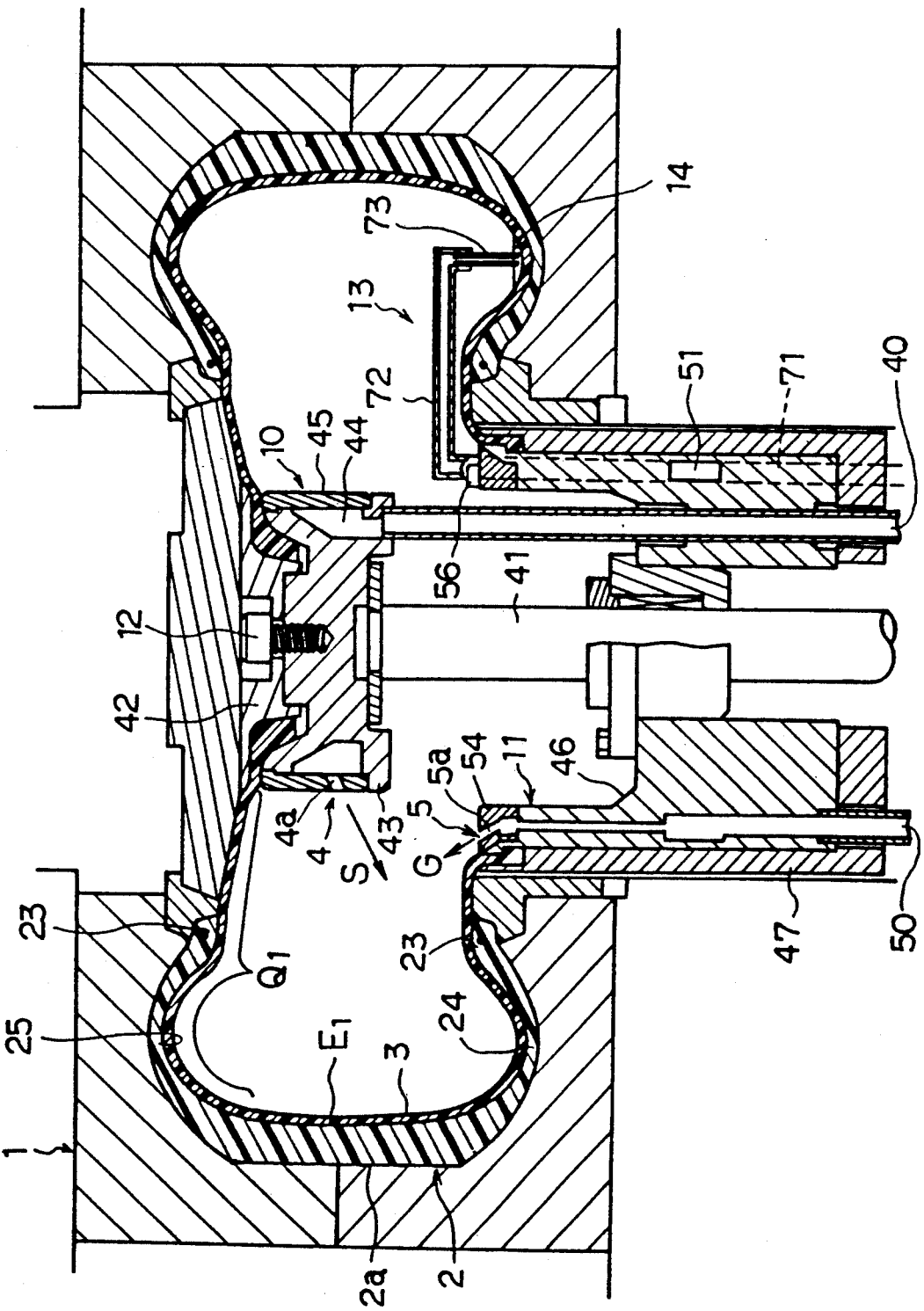

FIG. 10 shows a different embodiment particularly applied to a high aspect ratio tire having a large diameter.

The large diameter high aspect ratio tire has a sectional height which is larger than its maximum sectional width. That is, the distance from the steam supply opening to the tread surface is large and the distance from the tread 2a to the bead portion 23 is also large. Therefore, in case that steam is blown horizontally to the equator E1, the velocity of the steam which contacts with the tread 2a becomes small and the direct heating effect provided by the steam jet to the inside of the vulcanizing chamber also becomes small. Further, because the distance from the tread 2a to the bead portion 23 is also large, the heating effect provided by the return stream of the steam also becomes small and the heating rate at the bead portion slows down relatively. Thus, after the heating medium flow velocity approaches to approximately zero, the temperature of the lower bead portion 23 is apt to be lower than other part as a result of the above-mentioned insufficient heating.

In that case, there can be employed a method and an apparatus as shown in FIG. 10 wherein the heating medium (steam) is supplied from the upper position of the center of the vulcanizing chamber downwardly to the lower sidewall 24, so that the steam distribution toward the lower bead portion 23 can be increased to rectify the above-mentioned insufficient heating.

Also in this case, the previously mentioned drain discharging mechanism can be employed in combination with the above-mentioned construction, so that the accumulated drain in the bottom of the vulcanizing chamber is forcedly discharged. Because this embodiment is almost similar to the embodiment of FIG. 1 except for the steam supply direction mentioned above, a further explanation therefor is omitted.

As apparatus of the present invention employs as already mentioned a structure in which the heating medium supply nozzle 45 is removably attached by means of bolts or the like, the direction, the number and the diameter of the supply opening 4 can be selected conformably to the tire size.

Further, by blowing the pressurizing medium in an inclined upward direction, for example toward the upper sidewall portion 25, the low temperature pressurizing gas stream is directed along an inclined direction to the relatively high temperature steam accumulated locally in the upper portion because of the vertical temperature gradient in the tire 2. Thus, a vertically circulating mixing against the steam is generated by the kinetic energy of the pressurizing medium jet without causing the adiabatic compression of the steam. Accordingly, the local accumulation of the steam is rectified, an effective cooling is achieved with regard to the upper portion of the tire 2 which has been at relatively high temperature due to the temperature gradient the tire 2, and the temperatures of the upper portion and the lower portion of the tire 2 become uniform with each other.

In addition, by injecting pressurizing medium in an inclined upward direction and in a direction inclined relative to the radial direction, a circular flow along the circumferential direction is generated in the inner space of the tire and the mixing effect with steam is enhanced.

Further, since a supply nozzle 54 of a detachable type is employed in the embodiment, the pressurizing medium can be blown and supplied in the optimum directions conformably to the size and the shape of the elastomer article in order to obtain the most desirable result.

Figure 11:
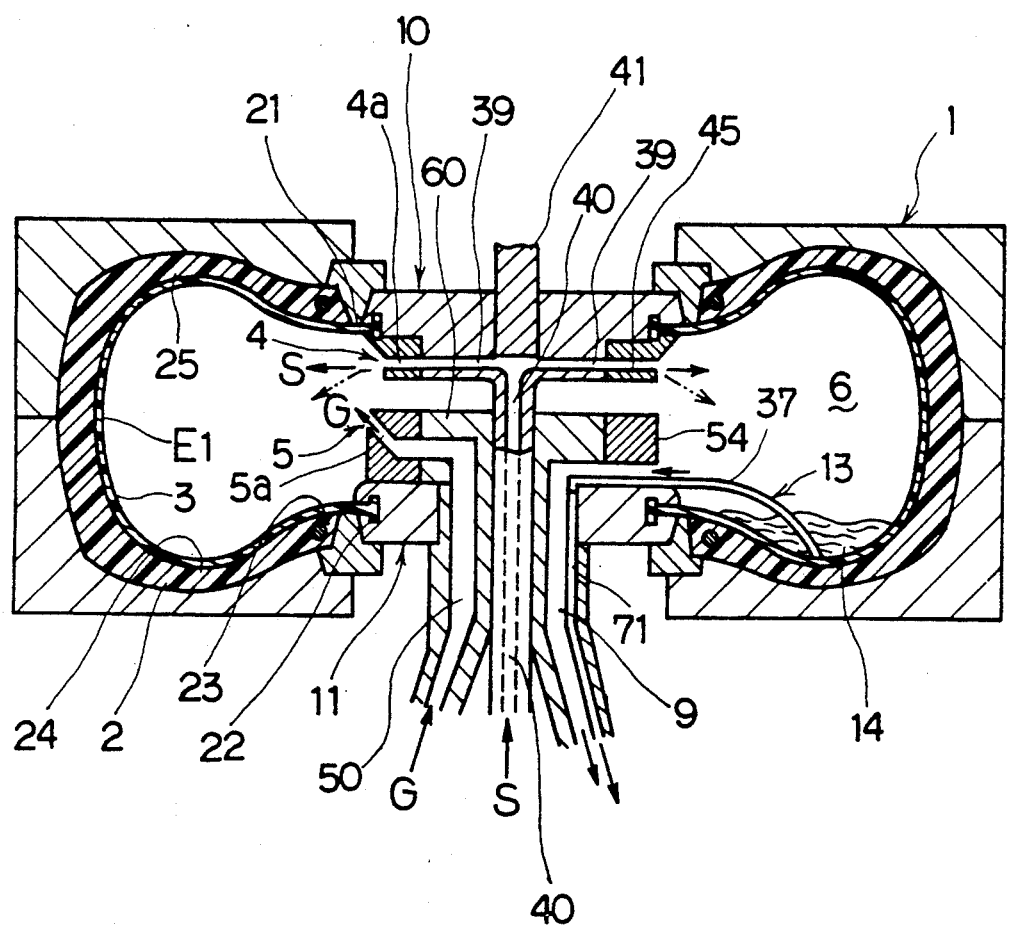

FIG. 11 shows another different embodiment in which a vulcanizing apparatus of a so-called Bag-O-Matic (BOM) type is used. In this apparatus a heating medium supply passage 40 is located in a center post 41, and an upper bladder holder portion 10 has a plurality of radially disposed branch passages 39, the branch passages 39 being in contact and communication with the heating medium supply passage 40. To the end openings of the branch passages 39, a heating medium supply nozzle 45 having a ring shape is fastened detachably by means of bolts omitted from the drawing A heating medium supply opening 4 of the supply nozzle 45 is directed to the horizontal direction. In FIG. 11, the heating medium is blown toward the tire equator (E1) or adjacent thereto and toward the upper and lower neighboring portions. Since the supply nozzle 45 is of a removable type, the supply opening 4 can optionally be directed toward an inclined downward direction as indicated by an imaginary line in FIG. 11. Therefore, a supply nozzle 45 having the most desirable opening can be attached conformably with the shape and the size of tire to be cured.

In addition, it is preferable to incline each heating medium supply path 4a relative to the radial direction in order to make the injected medium such as steam flow circularly along the circumferential direction.

With respect to the pressurizing medium (gas), a pressurizing medium supply passage 50 is located in a support (a hub) 60 of a lower bladder holder portion 11, and a plurality of pressurizing medium supply openings 5 are disposed in directions through the supply passage 50 toward the upper region of the vulcanizing chamber, for example toward an upper sidewall 25. The supply openings 5 are formed in a pressurizing medium supply nozzle 54 which is fastened removably to the support 60 by means of bolts omitted in the drawing. Therefore, a supply nozzle 54 having supply openings 5 in the most desirable direction, diameter and number can be attached conformably with the shape and the size of the tire.

Also in this case, by injecting the pressurizing medium in a direction inclined relative to the radial direction, the pressurizing medium flows circularly along the circumferantial direction in the inner space 6 of the vulcanizing chamber and provides effective mixing with the remaining steam.

The support 60 of the lower bladder holder portion 11 has an outlet passage 9 for steam and gas, and the upper end of the outlet passage 9 extends in the radial outward direction, an open end of which is located at one position in the inner space 6 of the tire.

In this type of embodiment, for example, a hose 37 having sufficient flexibility and a pipe 71 are used as a drain discharging mechanism 13 for discharging the drain water 14 accumulated at the lower sidewall 24 during vulcanizing operation. In this case, an up-down movement or a rotational movement of the pipe 71 is normally not required.

According to the present invention, as previously mentioned there can be employed a construction in which a drain discharging mechanism 13 is not provided and the heating medium (steam) is supplied horizontally from the upper position of the center of the vulcanizing chamber while the pressurizing medium (gas) is supplied from the lower position of the center of the vulcanizing chamber toward the upper region of the vulcanizing chamber. The meaning of the above expression "supplied horizontally" includes a state, as previously mentioned, that the medium is supplied toward the equator or its neighborhood of the tire 2, and the meaning of the term "upper region" includes, as previously mentioned, a region (Q1) ranging from the portion above the center of the vulcanizing chamber to the upper sidewall 25 of the tire 2. The meaning of the term "upper position of the center of the vulcanizing chamber" includes, as previously mentioned, the upper bladder holder portion 10, and the meaning of the term "lower position of the center of the vulcanizing chamber" includes, as previously mentioned, the upper end of the bugwell 46 in case of a rolling-in-bladder type vulcanizing apparatus as shown in FIG. 1 etc. That is, in such an apparatus a pressurizing medium supply nozzle 54 is removably attached to the upper end of the bagwell 46, and the supply nozzle 54 has along its circumferential direction a plurality of pressurizing medium supply openings 5 directed to the region (Q1) ranging from the portion above the center of the vulcanizing chamber to the upper sidewall 25 of the tire 2. In this connection, it is preferable to locate the supply opening 5 at the same height as or slightly lower than the upper end of the lower bead portion 23 of the tire 2 as shown in FIG. 1 and therefore, in the illustrated embodiment the supply openings 5 are located slightly lower than the upper end of the bead portion 23.

Therefore, the pressurizing gas is directly supplied right across the inner space 6 of the tire and the gas travels along a long distance in this space as shown in FIG. 1, so that the mixing effect with the remaining steam is enhanced and the temperature difference within the inner space 6 of the tire is rectified. Moreover, the injected steam contacts evenly with the upper half and the lower half of the tire and uniform heating of the upper half and the lower half is carried out.

In the Bag-0-Matic type vulcanizing apparatus as shown in FIG. 11, the term "lower position of the center of the vulcanizing chamber" indicates, as previously mentioned, the upper position of the support 60 of the lower bladder holder portion 11. That is, in such an apparatus a pressurizing medium supply nozzle 54 is removably attached to the upper position of the support 60, and the supply nozzle 54 has along its circumferential direction a plurality of pressurizing medium supply openings 5 directed to the previously mentioned region (Q1).

Therefore, also in this embodiment similar to the embodiment of FIG. 1, the pressurizing gas travels along a long distance within the inner space 6, so that the temperature difference within the inner space 6 of the tire is rectified and further the uniform heating of the upper half and the lower half is carried out.

Figure 12:
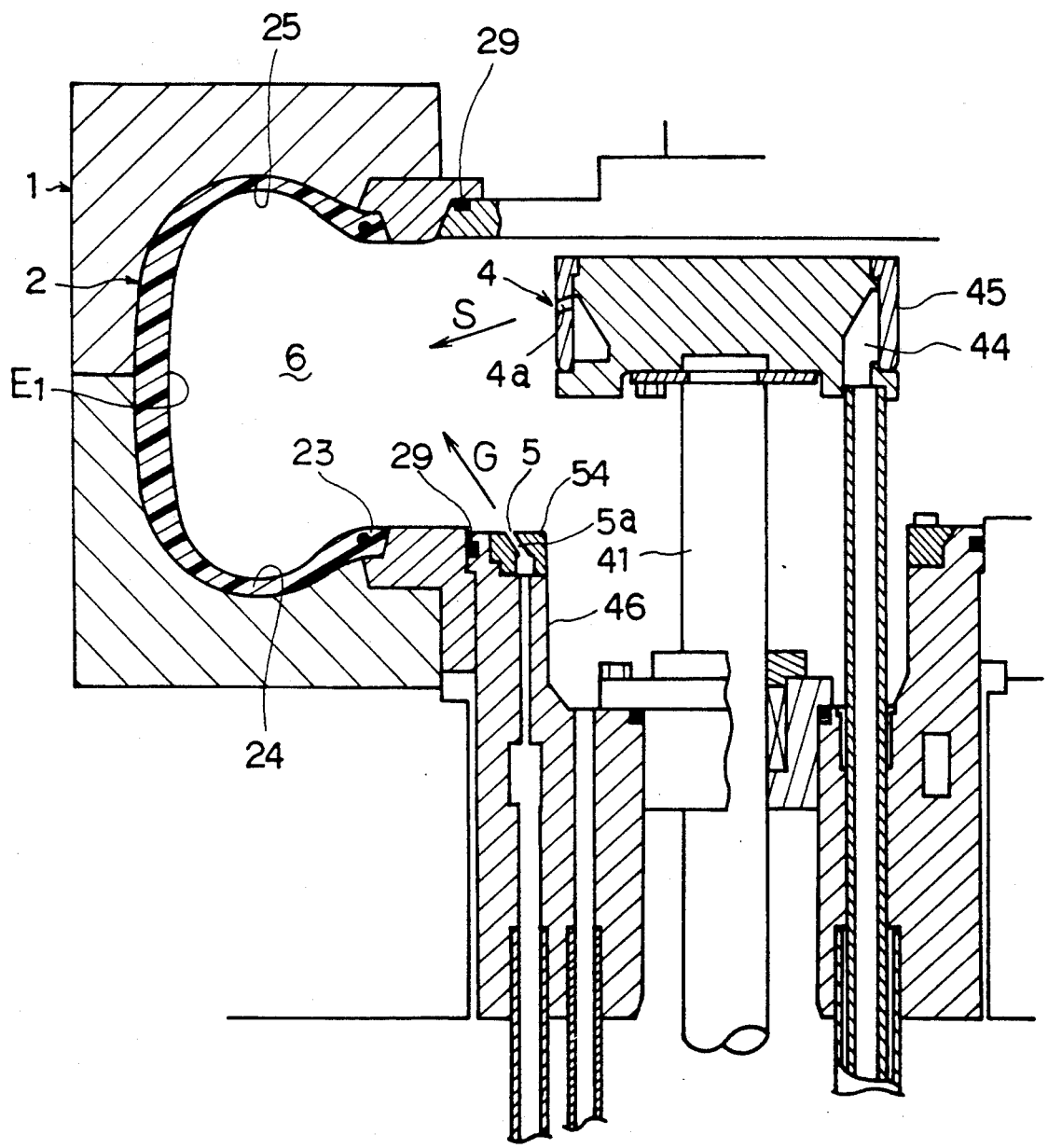
FIG. 12 is a cross sectional view showing a major part of a bladderless type vulcanizing apparatus of the present invention.

It is a matter of course that the present invention can be applied to a bladderless type apparatus, as shown in FIG. 12, in which a bladder is not employed. In that case, seal rings 29, 29 are to be employed as shown in FIG. 12.

It should be noted that the present invention is not limited to the specific embodiments above-mentioned, and further modification, for example an employment of a construction wherein a heating medium supply passage 40 is located in a center post 41, can be freely made without departing from the spirit or the scope of the present invention.

The present invention described hereinbefore provides the following advantageous effects.

In accordance with the present invention, there is employed a construction wherein high temperature steam as a heating medium is supplied from the upper position of the center of the vulcanizing chamber along a horizontal direction while low temperature gas as a pressurizing medium is supplied from the lower position of the center of the vulcanizing chamber toward the upper region of the vulcanizing chamber, a construction wherein a drain discharging mechanism 13 is additionally employed in combination with the above construction, or a construction wherein steam is supplied from the upper position of the center of the vulcanizing chamber toward the lower region of the vulcanizing chamber while a pressurizing gas is supplied from the lower position of the center of the vulcanizing chamber toward the upper region of the vulcanizing chamber and a drain water discharging mechanism 13 is additionally employed in combination therewith. Consequently, the method and apparatus of the present invention prevent a large temperature difference from occurring within an inner space of the elastomer product placed in the mold 1. Therefore, uniform vulcanizing can be carried out and the product quality in terms of uniformity can be improved. The prevention of such temperature difference can also provides shortening of vulcanizing time, improvement of productivity, and reduction of energy loss.

In addition, a vulcanizing apparatus having removable type supply nozzles 45, 54 allows supply nozzles 45, 54 having suitable directions in conformance with the shape and the size of the elastomer product to be easily attached, and therefore the heating medium and the pressurizing medium can be supplied in the optimum direction and in the optimum amount.

Temperature difference between the upperside and the lowerside within the inner space which occurs in a prior art apparatus can be prevented from occurring. For example in case of the apparatus of FIG. 1, the internal temperature change after the introduction of steam is shown in FIG. 7. That is, the temperature of the point (A1) at the bead portion 23 on the upperside of the tire 2 after the introduction of the pressurizing gas exhibits a behavior indicated by a solid line 18, the temperature of the point (B1) at the bead portion 23 on the lowerside after the introduction of the pressurizing gas exhibits a behavior indicated by a solid line 17, and as a result the temperature difference ($T_{11}$) between the point (A1) and the point (B1) is about 2° C. On the other hand in the prior art apparatus, reduction of steam velocity in the late stage in the heating medium introduction operation gradually causes temperature difference, and further in a stage after the pressurizing gas introduction the lower bead is cooled by the lower temperature of the gas because the supply opening is located at a lower position and the gas is supplied toward the lower region of the tire, while the upper bead temperature rises due to adiabatic compression effect in despite of the lower temperature of the introduced gas. Thus the temperature of the point (A1) at the upper bead portion and the point (B1) at the lower bead portion, for example, behave as indicated respectively by the imaginary lines 16 and 15, and as a result, the temperature difference ($T_{12}$) is, for example, 13° C. However, it is clearly observed as previously mentioned the method and the apparatus of the present invention sharply reduce the temperature difference.

In addition, as shown in FIG. 8, the temperature of the point (C1) at the upper sidewall 25 of the tire 2 after the introduction of the pressurizing gas exhibits a behavior indicated by a solid line 18a, the temperature of the point (D1) at the lower sidewall 24 after the introduction of the pressurizing gas exhibits a behavior indicated by a solid line 17a, and as a result the temperature difference ($T_{21}$) between the point (C1) and the point (D1) is about 2° C. On the other hand in the prior art apparatus, the temperature of the point (C1) at the upper sidewall behaves as indicated by the imaginary line 16a while the temperature of the point (D1) at the lower sidewall behaves as indicated by the imaginary line 15a, and the temperature difference becomes larger for the almost same reasons as those previously mentioned and as a result the temperature difference ($T_{22}$) between the upperside and the lowerside is, for example, about 12° C. However, it is clearly observed that the present invention sharply reduces the temperature difference.

Figure 13:
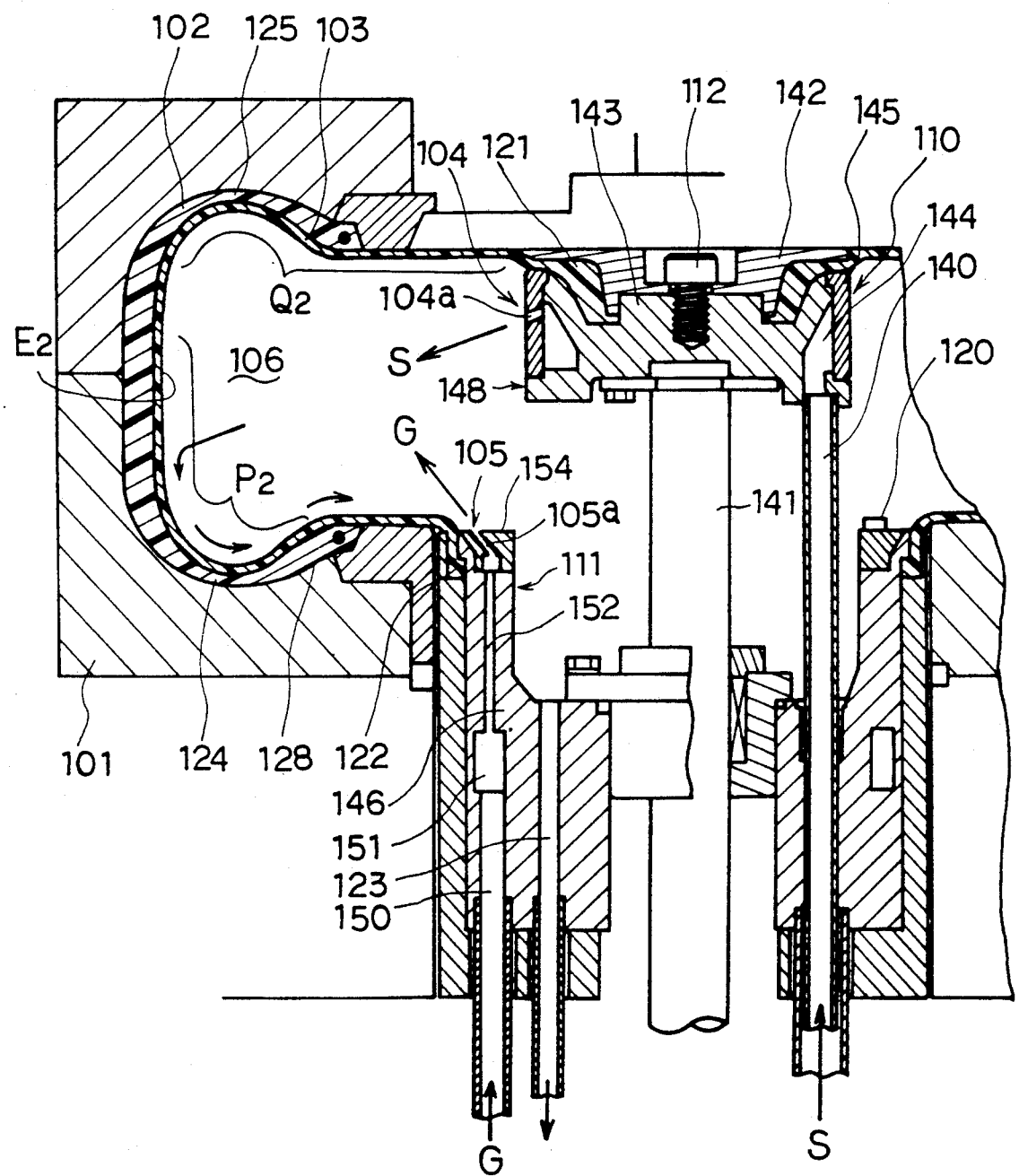
FIG. 13 is a sectional view showing another embodiment of the vulcanizing apparatus of the present invention.

FIG. 13 shows a different vulcanizing apparatus of the present invention of a so-called rolling-in-bladder type for a tire which is a typical example of the elastomer product. In the apparatus of FIG. 13, a green tire 102 is placed in a vulcanizing chamber formed in a mold 101, internal pressure for shaping is supplied a bladder 103, an upper inner end 121 of which is held by an upper bladder holder portion 110 while a lower inner end 122 thereof is held by a lower bladder holder portion 111, so that the green tire 102 is shaped so as to lie near and along the inside surface of the mold 101 and the shape of the green tire 102 becomes similar to the inside shape of the mold 101. Then the mold 101 is closed and a heating medium such as steam is supplied into the bladder 103 in order to heat and pressurize the tire 102 until the tire 102 becomes in the state shown in FIG. 13. When the temperature of the green tire 102 reaches a prespecified temperature or after a prespecified period of time expires, the supply of the heating medium is stopped and then a pressurizing medium such as nitrogen gas at a pressure not lower than the pressure of the heating medium is supplied until the end of the heating period into the bladder 103, so that the temperature of the green tire 102 is maintained at the prespecified temperature to complete the vulcanizing.

The elastomer product is a ring-shaped product having a circumferential hollow the open side of which faces to the radial inward direction, like an automobile tire.

The upper bladder holder portion 110 is located at the upper end of a center post 141, and comprises a ring 142, a block 143 and a heating medium supply nozzle 145 attached to the block 143. The ring 142 and the block 143 form an upper clamp ring 148, and the ring 142 and the block 143 are fastened by means of bolts 112 with the upper inner end 121 of the bladder 103 being nipped and held therebetween.

The heating medium supply nozzle 145 has a ring shape like the nozzle shown in FIG. 3A, and is set removably in the block 143 to form an annular space 144 between the block 143 and the nozzle 145 itself. The heating medium supply nozzle 145 has a plurality of heating medium supply openings 104 to make the annular space 144 communicate with the vulcanizing chamber. The heating medium supply openings 104 are disposed at prespecified intervals along the circumferential direction. The direction, number and diameter of the heating medium supply openings 104 are selected conformably with the tire size.

A heating medium supply passage 140 is connected to the block 143 on one side to allow the heating medium such as steam to flow into the annular space 144, and on the other side of the heating medium supply passage 140 is passed through a bugwell 146 and connected to a supply source of the heating medium. Thus the heating medium out of the supply passage 140 flows through the annular space 144 and blows horizontally from the heating medium supply openings 104 into the vulcanizing chamber. There are normally prepared two or more supply nozzles 145 having the supply openings 104 downwardly directed to a desired part within a region ranging from the equator (the tread center) (E1) or its neighborhood inside of the tire to lower sidewall 124 or its neighborhood of the tire 102.

The heating medium flows along the inside shape of the tire through the lower sidewall 124, and accordingly pushes the accumulated drain toward the lower bead portion 128 to discharge it to inside of the bugwell 146.

In the embodiment shown in FIG. 13, the supply opening 104 is directed to the neighborhood of the lower portion of the equator (E2), and therefore the heating medium is blown in inclined downward direction across the inner space 106 of the tire as shown by an arrow in FIG. 13.

In addition, a supply path 104a of the heating medium supply opening 104 is inclined relative to the radial direction like those shown in FIG. 3B, and therefore the heating medium emitted from the supply opening 104 circularly flows along the circumferential direction.

In the bugwell 146, a pressurizing medium supply passage 150 is formed for supplying inert gas such as nitrogen gas, and connects and communicates with an annular relay chamber 151 internally formed in the bugwell 146. The annular relay chamber 151, further connects and communicates with a plurality of branch passages 152 disposed at predetermined intervals along the circumferential direction. At the upper open ends of the branch passages 152, a pressurizing medium supply nozzle 154 is removably fastened by bolts 156 to the upper end of the bugwell. The pressurizing medium supply nozzle 154 has a plurality of pressurizing medium supply openings 105 to make the branch passages 152 communicate with the vulcanizing chamber. The pressurizing medium supply openings 105 are disposed at predetermined intervals along the circumferential direction. Thus the pressurizing medium from the supply passage 150 flows through the annular relay chamber 151 into the plurality of the branch passage 152 and blows from the supply openings 105 into the vulcanizing chamber.

The pressurizing medium supply nozzle 154 has a ring shape like the nozzle shown in FIG. 4A, and there are normally prepared two or more supply nozzels 154 having the supply opening 105 upwardly directed toward a desirable part within a region (Q2) ranging from a portion above the center of the vulcanizing chamber to the upper sidewall 125 of the tire 102.

In the embodiment shown in FIG. 13, the pressurizing medium supply opening 105 is directed to the upper sidewall 125 or its neighborhood of the tire 102, and therefore in this case, the pressurizing medium blows, as shown by an arrow in FIG. 13, along inclined upward direction across the inner space 106 of the tire.

Thus the pressurizing medium (gas) is blown and supplied from the lower position of the center of the vulcanizing chamber toward the upper region of the vulcanizing chamber, and accordingly a long flowing distance of the gas stream across the inner space 106 of the tire is permitted so that the mixing effect with the heating medium such as steam is enhanced and the temperature difference within the inner space 106 of the tire is rectified.

In this connection, a supply path 105a for pressurizing medium is inclined relative to the radial direction like the nozzle shown in FIG. 4B, and therefore the heating medium emitted from the supply opening 105 circularly flows along the circumferential direction.

Further, an outlet passage 123 for drain and gas is provided at the lower position of the bugwell 146, and the upper open end thereof is located in the inner space 106 of the tire.

There is explained next a vulcanizing method of the present invention using an apparatus having the above mentioned construction for a tire as a typical elastomer article.

First, a green tire 102 is attached to the outer peripheral surface of the bladder Then, a shaping medium is supplied through a pipe omitted in the drawing to inflate the bladder 103 until the shape of the tire 102 becomes similar to the inside shape of the mold 101 and lies near and along the inside of the mold 101, and subsequently the mold 101 are totally closed.

Then steam at 15 kg/cm$^2$ is introduced into a heating medium supply passage 140 in order to supply the steam for 5 minutes from a heating medium supply opening 104 to a vulcanizing chamber (i.e. an inner space 106 within the bladder 103). The steam out of the supply opening 104 is supplied toward the neighborhood of the lower portion of the equator (E2) (i.e. the tread center and major part thereof flows as a jet along the inside shape of the tire via the lower sidewall toward the lower bead portion.

Accordingly the heating medium pushes the accumulated drain in the bottom of the inside of the tire to lead and discharge it into the outlet passage 123, and the temperature of the lower sidewall rises.

This steam supply provides heating of the tire 102 to a temperature required to proceed vulcanization reaction, for example about 180° C.

Then a pressurizing gas at a lower temperature near the room temperature (e.g. 40° C.) and a pressure of 18 kg/cm$^2$ is introduced to a pressurizing medium supply passage 150 in order to supply pressurizing gas for 5 minutes upwardly from a pressurizing medium supply opening 105 into the inner space 106. The gas out of the supply opening 105 is supplied upwardly and provides cooling and mixing for the upper portion of the inner space 6, then the gas gradually flows downwardly and is mixed with the remaining steam.

Thus, by the cooling effect and the mixing effect occurring in the upper portion within the tire 102 by virtue of the upward stream of the pressurizing gas, large temperature difference between the upper portion and the lower portion in the inner space 106 is prevented from occurring, and accordingly the temperature difference along the vertical direction which is observed in the prior art apparatus can be prevented.

After the vulcanizing operation is completed, a valve in an outlet pipe omitted in the drawing is opened to discharge the mixture of gas and steam out of the inner space 106 via the outlet pipe. Subsequently, the above-mentioned valve is closed with another valve opened, the upper clamp ring, the center post 141, the bugwell 146 and the lower bladder holder portion 111 are moved downwardly to remove the bladder 103 from the inside of the tire 102, the mold 101 is opened, and the vulcanized tire 102 took out of the mold 101.

In the drawings the symbol (S) indicates steam as a heating medium and the symbol (G) indicates gas as a pressurizing medium.

Figure 14:
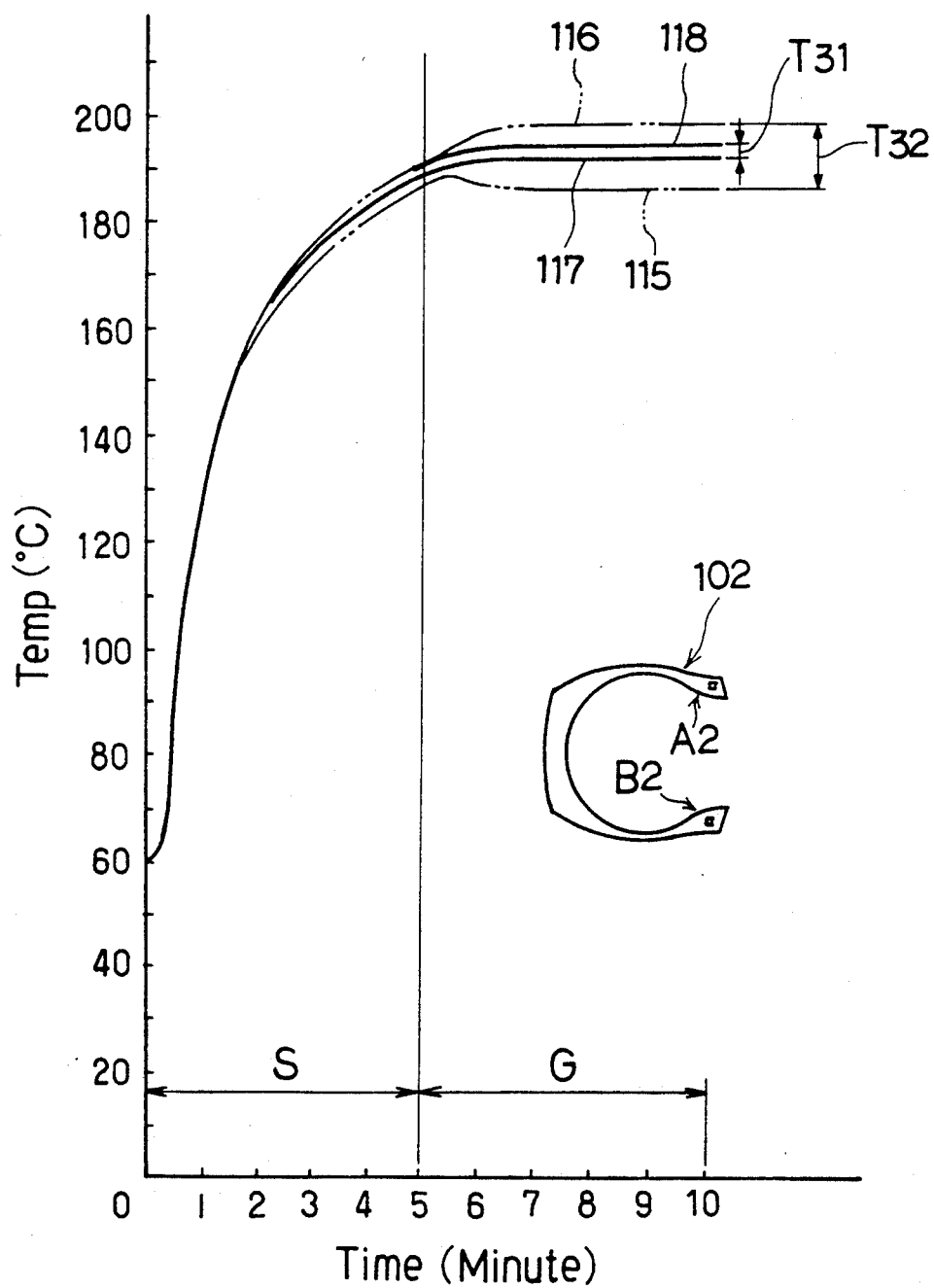
FIGS. 14 to 15 are graphs each of which shows an example temperature difference in an elastomer article.

FIG. 14 shows a temperature difference between a point (A2) at the bead portion an the upperside and a point (B2) at the bead portion on the lowerside of the tire 102. The temperature of the point (A2) after the introduction of the pressurizing gas exhibits a behavior indicated by a solid line 118, the temperature of the point (B2) after the introduction of the pressurizing gas exhibits a behavior indicated by a solid line 117, and as a result the temperature difference ($T_{31}$) between the point (A2) and the point (B2) is about 4° C. which is remarkably small value compared with the prior art method (13° C).

Figure 15:
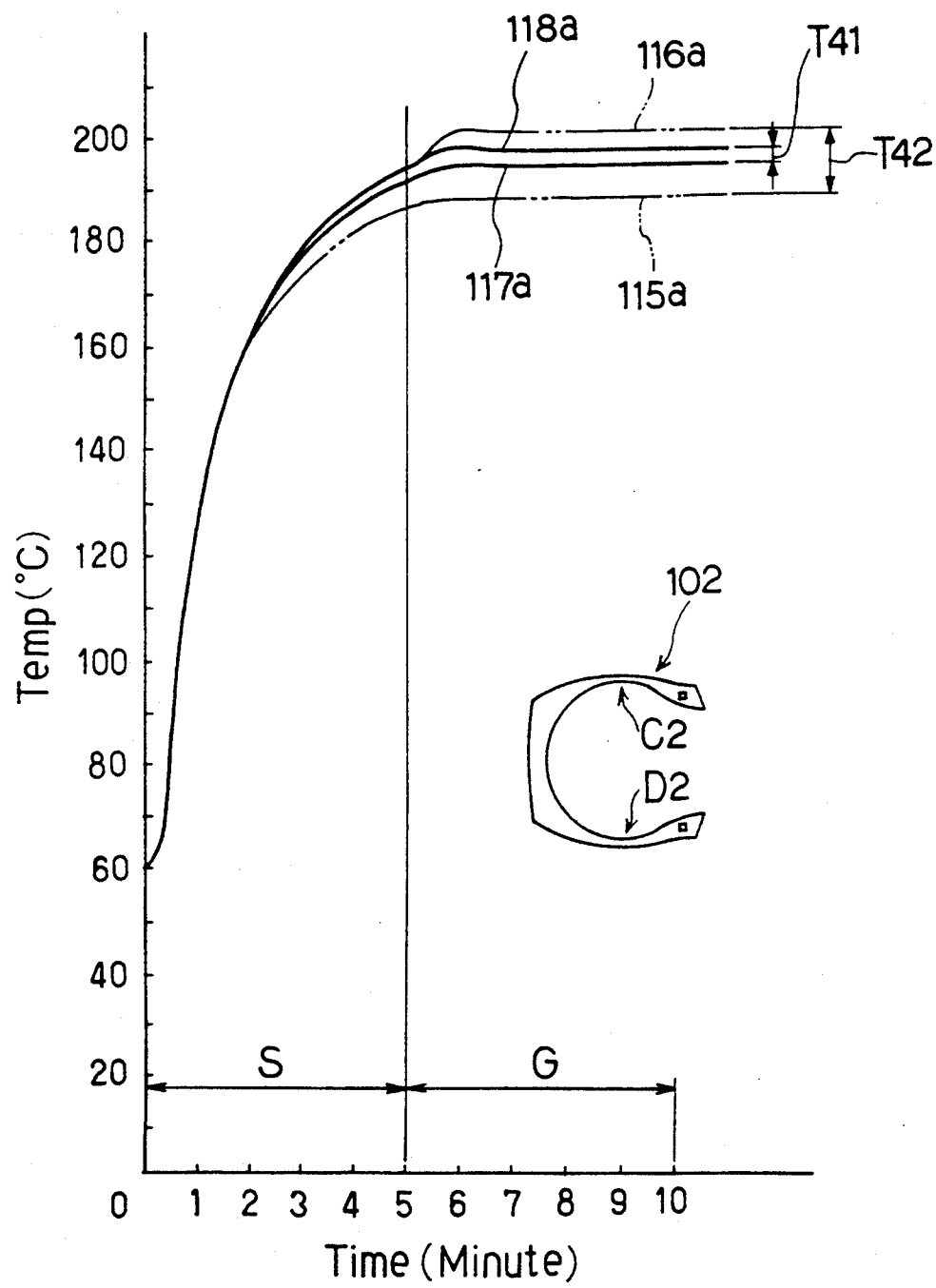

FIG. 15 shows a temperature difference between a point (C2) at the upper sidewall and a point (D2) at the lower sidewall of the tire 102. The temperature of the point (C2) after the introduction of the pressurizing gas exhibits a behavior indicated by a solid line 118a, the temperature of the point (D2) after the introduction of the pressurizing gas exhibits a behavior indicated by a solid line 117a, and the temperature difference ($T_{41}$) between the point (C2) and the point (D2) is about 3° C. which is remarkably small value compared with the prior art method (12° C.).

Figure 16:
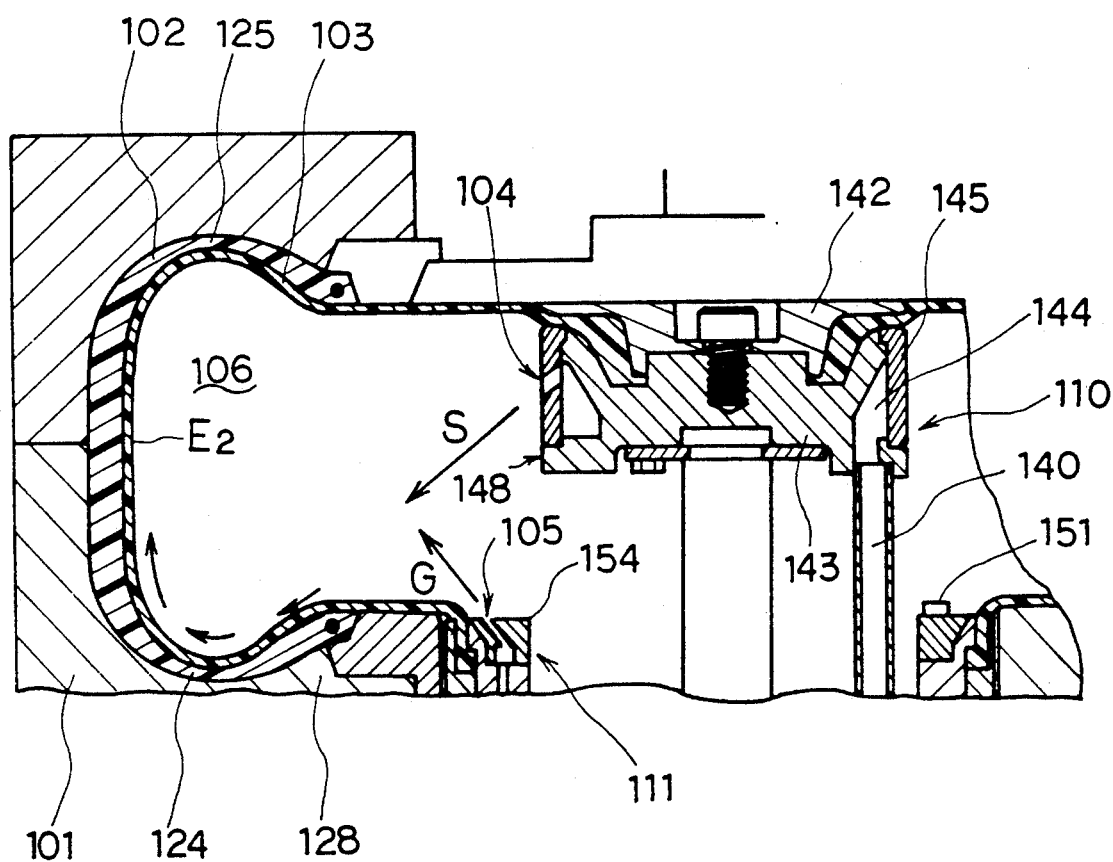
FIGS. 16 to 19 are sectional views each of which shows a different embodiment.

FIG. 16 shows a different embodiment in which the heating medium out of the supply opening 104 is blown further downwardly compared with the embodiment shown in FIG. 13, so as to supply the heating medium toward the lower sidewall 124 of the tire 102. Since the embodiment of FIG. 16 is similar to the embodiment of FIG. 13 except for the above-mentioned feature, a further explanation is omitted.

In the embodiment of FIG. 16, the heating medium flows as a jet, as shown by an arrow in FIG. 16, through the lower bead portion 128 to the lower sidewall 124, and further toward the lower portion of the equator (E2) of the tire. This heating medium stream blows off and pushes away the accumulated drain at the lower sidewall 124. That is, insufficient heating at the lower sidewall 124 due to the accumulated drain water is prevented.

Figure 17:
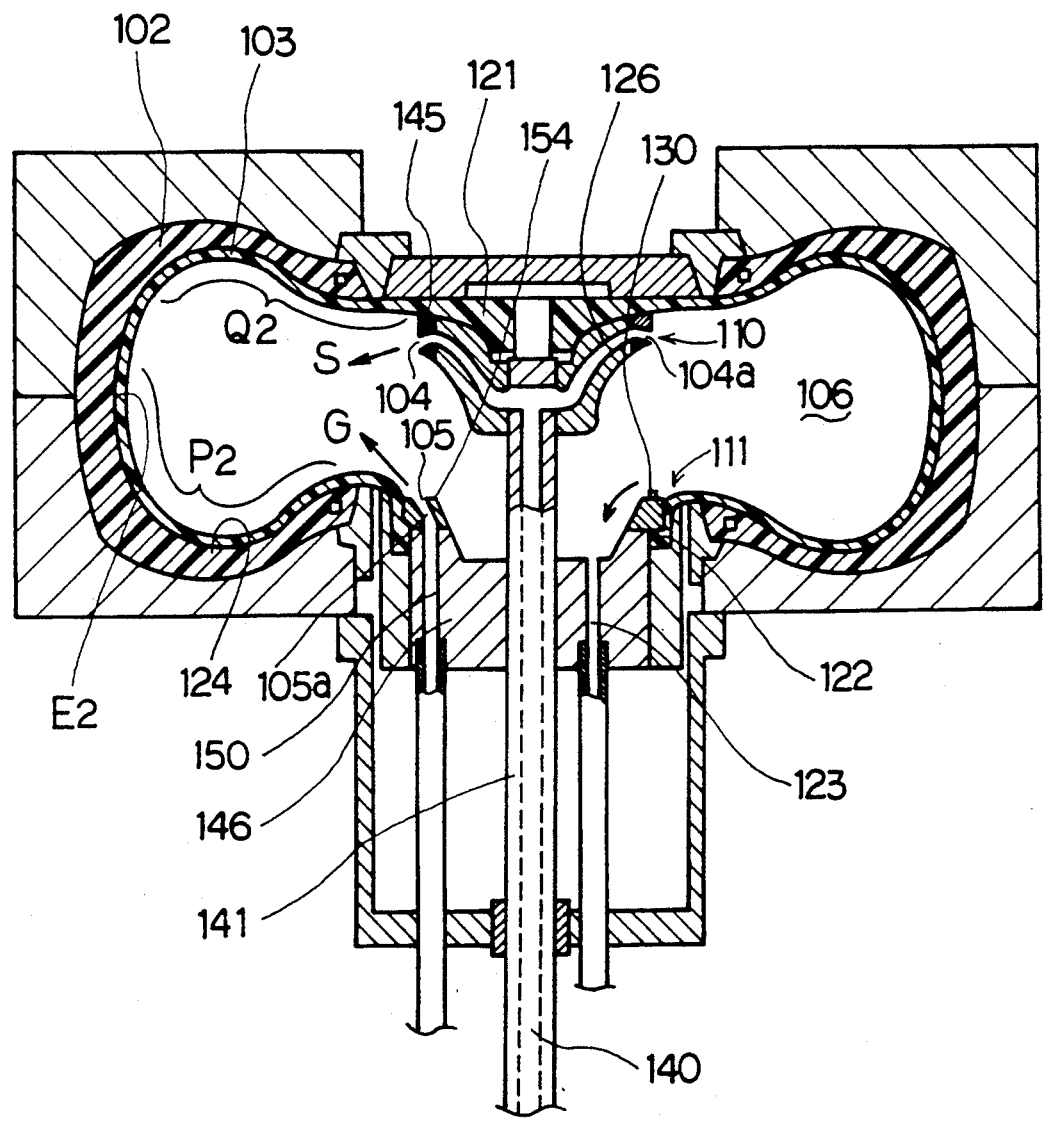

FIG. 17 shows another different embodiment using a rolling-in-bladder type vulcanizing apparatus, in which a supply passage 140 for the heating medium (steam) located in a center post 141, and an upper bladder holder portion 110 has a plurality of radially disposed branch passages 126, the branch passages 126 being in contact and communication with the heating medium supply passage 140.

To end openings of the branch passages 126, a heating medium supply nozzle 145 having a ring shape is fastened detachably. A heating medium supply opening 104 of the supply nozzle 145 is directed to the inclined downward direction in order to supply the heating medium toward the equator (E2) (the tread center).

In addition, it is preferable to incline each heating medium supply path 104a of the supply opening 104 relative to the radial direction in order to make the injected medium such as steam flow circularly along the circumferential direction in the inner space 106 of the tire.

The bagwell 146 has a pressurizing medium supply passage 150 and an outlet passage 123 for drain water discharging.

To the end opening of the pressurizing medium supply passages 150, a heating medium supply nozzle 154 having a ring shape is fastened detachably. The numeral 130 indicates a fastening bolt. The supply nozzle 154 has a plurality of pressurizing medium supply openings 105 disposed at predetermined intervals along the circumferential direction, the supply openings 105 being capable of blowing the pressurizing medium toward an upper sidewall 125 of the tire 102.

In this connection, by inclining the direction of pressurizing medium supply paths 105a relative to the radial direction, the pressurizing medium flows circularly along the circumferential direction in the inner space 106 of the tire.

Figure 18:
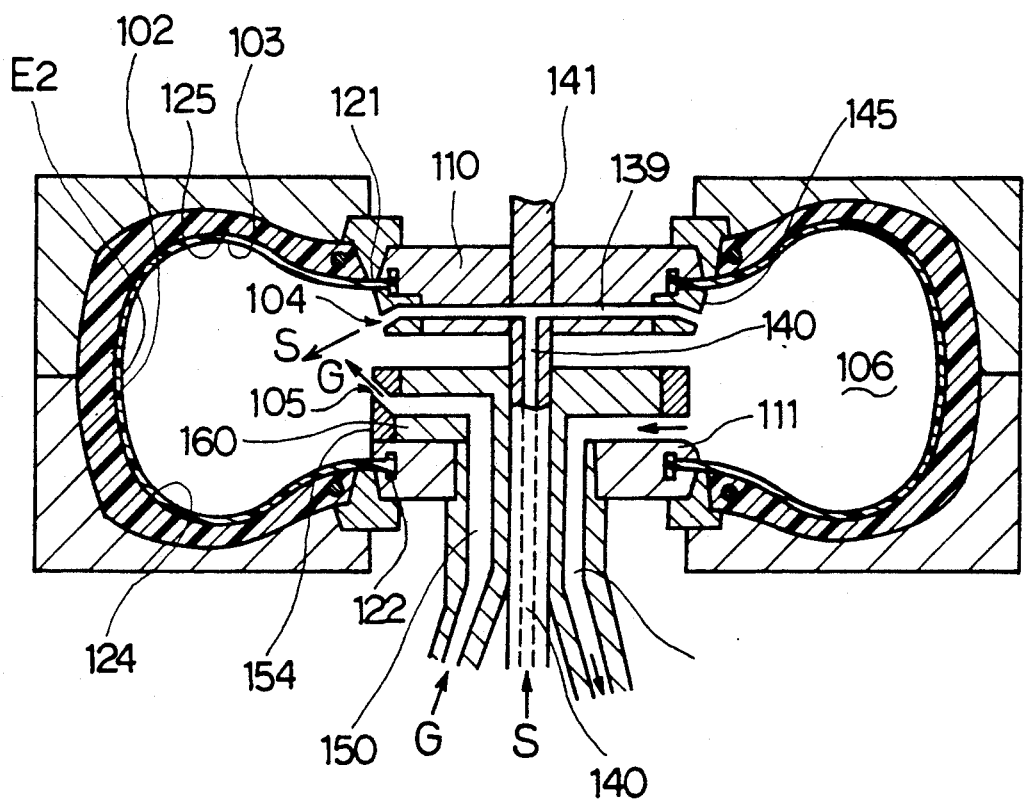

FIG. 18 shows another different embodiment in which a vulcanizing apparatus of a so-called Bag-O-Matic (BOM) type is used. In this apparatus a heating medium (steam) supply passage 140 is located in a center post 141, and an upper bladder holder portion 110 has a plurality of radially disposed branch passages 139, the branch passages 139 being in contact and communication with the heating medium supply passage 140. To end openings of the branch passages 139, a heating medium supply nozzle 145 having a ring shape is fastened detachably by means of bolts omitted from the drawings. A heating medium supply opening 104 of the supply nozzle 145 is directed to the inclined downward direction, for example toward the equator (E2) of the tire or neighborhood of its lower portion. Since the supply nozzle 145 is of a removable type, a supply nozzle 145 having the most desirable openings, with regard to the direction, diameter and number, can be attached conformably with the shape and the size of the tire.

With respect to the pressurizing medium (gas), a pressurizing medium supply passage 150 is located in a support (a hub) 160 of a lower bladder holder portion 111, and a plurality of pressurizing medium supply openings 105 communicating with the supply passage 150 are disposed in directions toward the upper region of the vulcanizing chamber, for example toward an upper sidewall 125. The supply openings 105 are formed in a pressurizing medium supply nozzle 154 which is fastened removably to the support 160 by means of bolts omitted in the drawing. Therefore, a supply nozzle 154 having supply openings 105 in the most desirable direction, diameter and number can be attached conformably with the shape and the size of the tire.

Also in this case, by injecting the pressurizing medium in a direction inclined relative to the radial direction, the pressurizing medium flows circularly along the circumferential direction in the inner space 106 of the vulcanizing chamber and provides effective mixing with the remaining steam.

The support 160 of the lower bladder holder portion 111 has an outlet passage 109 for steam and gas, and the upper end of the outlet passage 109 extends in the radial outward direction, an open end of which is located at one position in the inner space 106 of the tire.

According to the present invention, there can be employed a construction in which the pressurizing medium (gas) is supplied from the lower position of the center of the vulcanizing chamber toward the upper region of the vulcanizing chamber independently of the supply position or the supply direction of the heating medium (steam). The meaning of the term "lower position of the center of the vulcanizing chamber" includes, as previously mentioned, the upper end of the bagwell 146 in case of the rolling-in-bladder type vulcanizing apparatus as shown in FIG. 13 and FIG. 17. That is, in such an apparatus a pressurizing medium supply nozzle 154 is removably attached to the upper end of the bagwell 146, and the supply nozzle 154 has along its circumferential direction a plurality of pressurizing medium supply openings 105 directed to the region (Q2) ranging from the portion above the center of the vulcanizing chamber to the upper sidewall 125 of the tire 102. In this connection, it is preferable to locate the supply opening 105 at the same height as or slightly lower than the upper end of the lower bead portion 128 of the tire 102, and therefore, in the illustrated embodiment the supply openings 105 at located slightly lower than the upper end of the bead portion 128.

Therefore, the pressurizing gas is directly supplied right across the inner space 106 of the tire and the gas travels along a long distance in this space, so that the mixing effect with the remaining steam is enhanced and the temperature difference within the inner space 106 of the tire is rectified.

In the Bag-0-Matic type vulcanization apparatus as shown in FIG. 18, the term "lower position of the center of the vulcanizing chamber" indicates, as previously mentioned, the upper position of the support 160 of the lower bladder holder portion 111. That is, in such an apparatus a pressurizing medium supply nozzle 154 is removably attached and the supply nozzle 154 has along its circumferential direction a plurality of pressurizing medium supply openings 105 directed to the previously mentioned region (Q2).

Therefore, also in this embodiment similarly to the embodiments of FIG. 13 and FIG. 17, the pressurizing gas travels along a long distance within the inner space 106, so that the temperature difference within the inner space 106 of the tire is rectified.

Figure 19:
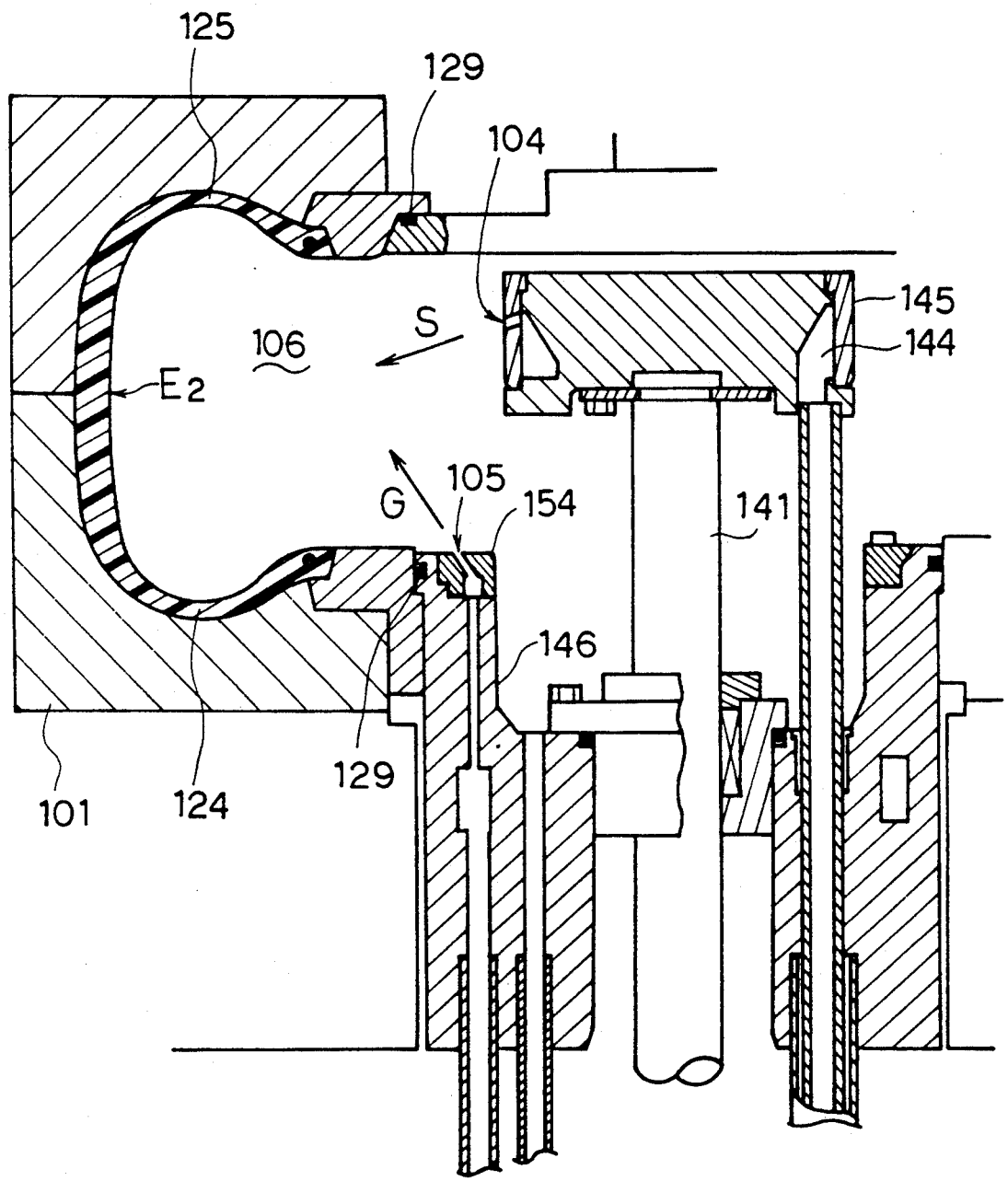
Figure 20:
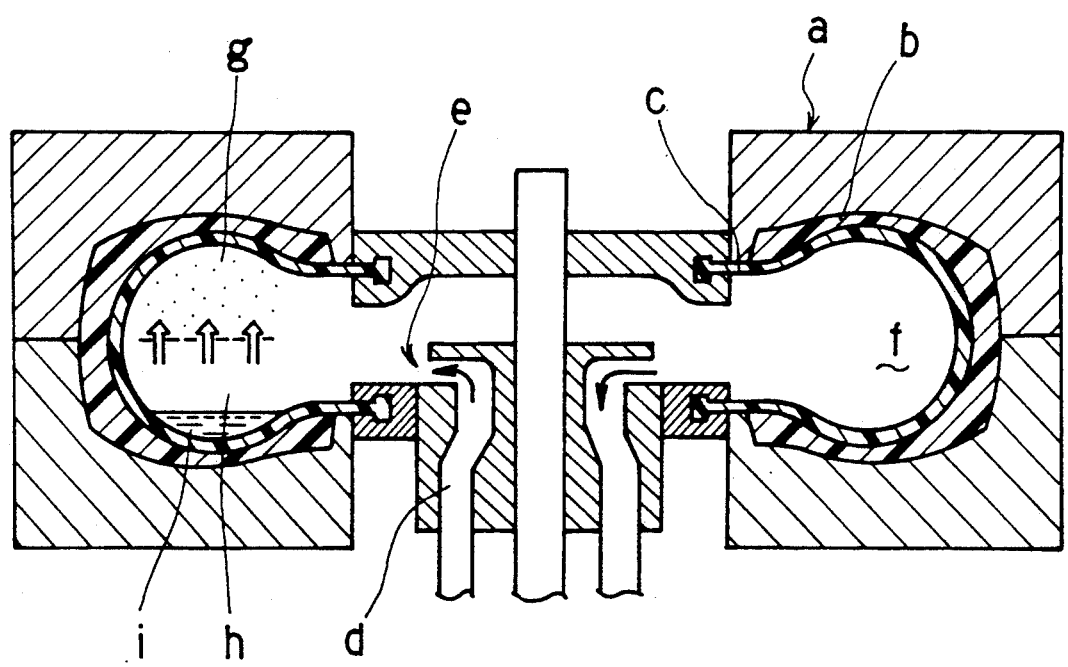
FIG. 20 is a sectional view showing a prior art apparatus.

It is matter of course that the present invention can be applied to a bladderless type apparatus, as shown in FIG. 19, in which a bladder is not employed. In that case, seal rings 129, 129 are to be employed as shown in FIG. 19.

With respect to a heating medium supply assembly in FIG. 19, a block is attached to the upper end of a center post 141 and a ring-shaped heating medium supply nozzle 145 is attached to the block so that an annular space 144 is formed. A heating medium supply passage is connected to the annular space 144 and heating medium supply openings 104 are formed in the supply nozzle 145.

With respect to a pressurizing medium supply assembly in FIG. 19, a pressurizing medium supply nozzle 154 is attached to the upper portion of a bugwell 146 and a pressurizing medium supply passage is connected to the supply nozzle 154.

Thus, the heating medium is supplied downwardly from the supply openings at the upper position, while the pressurizing medium is supplied upwardly from the supply openings at the lower position.

It should be noted that the present invention is not limited to the specific embodiments above-mentioned, and further modification, for example in FIG. 13 an employment of a construction wherein a heating medium supply passage 140 is located in a center post 141 can be freely made without departing from the spirit or the scope of the present invention.

The present invention described also provides the following advantageous effects.

In accordance with a method wherein the heating medium is blown and supplied from the upper position of the center of the vulcanizing chamber toward the lower region of the vulcanizing chamber, while the pressurizing medium is blown and supplied from the lower position of the center of the vulcanizing chamber toward the upper region of vulcanizing chamber, the drain due to the condensation of the heating medium accumulated at the lower sidewall 124 of the elastomer article is forcedly discharged by the jet of the heating medium stream and consequently the heating condition in the elastomer product becomes uniform. Therefore, the uniform vulcanizing is attained and the product quality in term of uniformity can be improved Especially, the product quality can be further improved by employing a method wherein the heating medium is supplied from the upper bladder holder portion, or a method wherein the heating medium is blown toward the lower region, the lower region being the region (P2) ranging from the equator (E2) of the elastomer article or its neighborhood to the lower sidewall or its neighborhood, and the pressurizing medium is blown toward the upper region, the upper region being the region (Q2) ranging from the portion above the center of the vulcanizing chamber to the upper sidewall portion (125) of the elastomer article.

The lower temperature pressurizing gas is supplied upwardly from the lower position of the center of the vulcanizing chamber, with respect to the method wherein the heating medium is blown and supplied from the upper position of the center of the vulcanizing chamber toward the lower region of the vulcanizing chamber, while the pressurizing medium is blown and supplied from the lower position of the center of the vulcanizing chamber toward the upper region of the vulcanizing chamber, and the method wherein particularly the heating medium is supplied from the upper bladder holder portion and another method wherein the pressurizing medium is blown and supplied from the lower position of the center of the vulcanizing chamber toward the upper region of vulcanizing chamber, regardless of the supply position or the supply direction of the heating medium. Thus, an effective mixing for the heating medium (steam) and the pressurizing medium (gas) is provided, and accordingly a large temperature difference within the inner space is prevented from occurring and uniform vulcanizing can be carried out. The prevention of such temperature difference can also provides shortening of vulcanizing period, improvement of productivity, and reduction of energy loss.

By using an apparatus wherein there is formed a heating medium supply opening at the upper position of the center of the vulcanizing chamber for blowing the heating medium toward the lower region of the vulcanizing chamber, and there is formed a pressurizing medium supply opening at the lower position of the center of the vulcanizing chamber for blowing the pressurizing medium toward the upper region of the vulcanizing chamber, the same advantageous effects as those of the method mentioned above can be obtained.

Especially, by employing an apparatus wherein the heating medium is supplied from the upper bladder holder portion, or a apparatus wherein the pressurizing medium is supplied from the bugwell or the support of the lower bladder holder, such advantageous effects are further enhanced.

Further, by employing an apparatus wherein the heating medium supply openings are formed in a heating medium supply nozzle of a detachable type, or an apparatus wherein the pressurizing medium supply openings are formed in a pressurizing medium supply nozzle formed in a pressurizing medium supply nozzle of a detachable type, the supply nozzles 145, 154 can be freely and easily replaced. This allows supply nozzles having suitable directions in conformance with the shape and the size of the elastomer article to be easily attached, and therefore the heating medium and the pressurizing medium can be supplied in the optimum direction and in the optimum amount.

What we claimed is:

1. A method for vulcanizing an elastomer product including a heating step, wherein said elastomer product is placed in a vulcanizing chamber formed in a mold, a heating steam at an elevated pressure is supplied to said vulcanizing chamber to heat and pressurize said elastomer product until said elastomer product reaches a prespecified temperature or for a prespecified period of time, said steam supply is stopped and inert gas, as a pressurizing gas at a pressure not lower than said steam supply pressure, is supplied to said vulcanizing chamber until the end of the heating step, and a discharging step subsequent to said heating step, wherein said steam and said pressurizing gas are discharged to complete the vulcanizing, wherein said steam is blown in and supplied from an upper position of the center of said vulcanizing chamber into said vulcanizing chamber in a substantially horizontal direction, while said pressurizing gas is blown in and supplied from a lower position of the center of said vulcanizing chamber toward an upper region of said vulcanizing chamber.

2. A method for vulcanizing an elastomer product of claim 1, wherein said steam is blown toward an equator of said elastomer product or its neighborhood in a horizontal direction, while said pressurized gas is blown in toward said upper region and said upper region ranging from a portion above the center of said vulcanizing chamber to an upper sidewall portion of said elastomer product.

3. A method for vulcanizing an elastomer product including a heating step, wherein said elastomer product is placed in a vulcanizing chamber formed in a mold, a heating steam at an elevated pressure is supplied to said vulcanizing chamber to heat and pressurize said elastomer product until said elastomer product reaches a prespecified temperature or for a prespecified period of time, said steam supply is stopped and inert gas, as a pressurizing gas at a pressure now lower than said steam supply pressure, is supplied to said vulcanizing chamber until the end of the heating step, and a discharging step, subsequent to said heating step, wherein said steam and said pressurizing gas are discharged to complete the vulcanizing, wherein said steam is blown in and supplied from an upper position of the center of said vulcanizing chamber into said vulcanizing chamber in a substantially horizontal direction, while said pressurizing gas is blown in and supplied form a lower position of the center of said vulcanizing chamber toward an upper region of said vulcanizing chamber, and condensate accumulated in the bottom of said vulcanizing chamber, due to condensation of said steam, is forcedly discharged out of said elastomer product by means of a discharging means.

4. A method for vulcanizing an elastomer product including a heating step wherein said elastomer product is placed in a vulcanizing chamber formed in a mold, a heating steam at an elevated pressure is supplied to said vulcanizing chamber to heat and pressurize said elastomer product until said elastomer product reaches a prespecified temperature or for a prespecified period of time, said steam supply is stopped and inert gas, as a pressurizing gas at a pressure not lower than said steam supply pressure, is supplied to said vulcanizing chamber until the end of the heating step, and a discharging step, subsequent to said heating step, wherein said steam and said pressurizing gas are discharged to complete the vulcanizing, wherein said steam is blown in and supplied from an upper position of the center of said vulcanizing chamber toward a lower region of said vulcanizing chamber, while said pressurizing gas is blown in and supplied from a lower position of the center of said vulcanizing chamber toward an upper region of said vulcanizing chamber, and condensate, accumulated in the bottom of said vulcanizing due to condensation of said steam, is forcedly discharged out of said elastomer product by means of a discharging means.

5. A method for vulcanizing an elastomer product including a heating step wherein said elastomer product is placed in a vulcanizing chamber formed in a mold, steam at an elevated pressure is supplied to said vulcanizing chamber to heat and pressurize said elastomer product until said elastomer product reaches a prespecified temperature or for a prespecified period of time, said steam supply is stopped and inert gas, as a pressurizing gas at a pressure not lower than said steam supply pressure, is supplied to said vulcanizing chamber until the end of the heating step, and a discharging step, subsequent to said heating step, wherein said steam and said pressurizing gas are discharged to complete the vulcanizing, wherein said steam is blown in and supplied from an upper position of the center of said vulcanizing chamber toward a lower region of said vulcanizing chamber, while said pressurizing gas is blown in and supplied from a lower position of the center of said vulcanizing chamber toward an upper region of said vulcanizing chamber.

6. A method for vulcanizing an elastomer product of claim 5, wherein said upper position of the center of said vulcanizing chamber is an upper bladder holder portion.

7. A method for vulcanizing an elastomer product as claimed in claim 5, wherein said steam is blown toward said lower region, said lower region being a region ranging from an equator of said elastomer product or its neighborhood to a lower sidewall or its neighborhood, and said pressurizing gas is blown toward said upper region, said upper region being another region ranging from a portion above the center of said vulcanizing chamber to an upper sidewall portion of said elastomer product.

8. A method for vulcanizing an elastomer product as claimed in claim 6, wherein said steam is blown toward said lower region, said lower region being a region ranging from an equator of said elastomer product or its neighborhood to a lower sidewall or its neighborhood, and said pressurizing gas is blown toward said upper region, said upper region being another region ranging from a portion above the center of said vulcanizing chamber to an upper sidewall portion of said elastomer product.

9. A method for vulcanizing an elastomer product including a heating step wherein said elastomer product is placed in a vulcanizing chamber formed in a mold, a steam at an elevated pressure is supplied to said vulcanizing chamber from an upper position of the center of the vulcanizing chamber toward a lower region therein to heat and pressurize said elastomer product until said elastomer product reaches a prespecified temperature or for a prespecified period of time, said steam supply is stopped and inert gas as a pressurizing gas at a pressure not lower than said steam supply pressure, is supplied to said vulcanizing chamber until the end of the heating step, and a discharging step, subsequent to said heating step, wherein said steam and said pressurizing gas are discharged to complete the vulcanizing, wherein said pressurizing gas is blown in and supplied from a lower portion of the center of said vulcanizing chamber toward an upper region of said vulcanizing chamber.

10. An apparatus for vulcanizing an elastomer product including vulcanizing chamber means formed in a mold means; means to place a preform of said elastomer product in said mold means; means to supply steam at an elevated pressure to said vulcanizing chamber to heat and pressurize said elastomer product until said elastomer product reaches a prespecified temperature or for a prespecified period of time; means to stop the supply of said steam; means to supply an inert pressurizing gas, at a pressure not lower than said steam supply pressure, to said vulcanizing chamber until the end of a heating period; means to maintain the temperature of said elastomer product at said prespecified temperature during the heating period and further including a steam supply opening of an upper position of the center of said vulcanizing chamber, positioned to blow said steam thereinto in a substantially horizontal direction or toward a lower region of said vulcanizing chamber means, and a pressurizing gas supply opening, at a lower position of the center of said vulcanizing chamber, to blow said pressurizing gas thereinto toward an upper region of said vulcanizing chamber.

11. An apparatus as claimed in claim 10 for vulcanizing an elastomer product, wherein said upper position of the center of said vulcanizing chamber is an upper bladder holder portion.

12. An apparatus as claimed in claim 10 for vulcanizing an elastomer product, wherein said lower position of the center of said vulcanizing chamber contains a bagwell or a support for a lower bladder holder.

13. An apparatus as claimed in claim 10 for vulcanizing an elastomer product, wherein said steam supply opening is formed in a steam supply nozzle of a detachable type.

14. An apparatus as claimed in claim 10 for vulcanizing an elastomer product, wherein said pressurizing as supply opening is formed in a pressurizing supply nozzle of a detachable type.

15. An apparatus as claimed in claim 10 for vulcanizing an elastomer product comprising a vulcanizing chamber formed in a mold means; means to place a preform of said elastomer product in said mold; means to supply steam at an elevated pressure to said vulcanizing chamber to heat and pressurize said elastomer product until said elastomer product reaches a prespecified temperature or for a prespecified period of time; means to stop the supply of said steam and to supply inert pressurizing gas, at a pressure not lower than said steam supply pressure, to said vulcanizing chamber until the end of a heating period; means to maintain the temperature of said elastomer product at said prespecified temperature during the heating period, and further including a steam supply opening at an upper position of the center of said vulcanizing chamber for blowing said steam in a horizontal direction or toward a lower region of said vulcanizing chamber, a pressurizing gas supply opening at a lower position of the center of said vulcanizing chamber for blowing said pressurizing gas toward an upper region of said vulcanizing chamber; and a discharging means for forcedly discharging condensate, accumulated in the bottom of said vulcanizing chamber due to condensation of said steam, out of said elastomer product.

16. An apparatus as claimed in claim 10 for vulcanizing an elastomer product as claimed in claim 15, wherein said steam supply opening is formed in a steam supply nozzle of a detachable type.

17. An apparatus as claimed in claim 10 for vulcanizing an elastomer product as claimed in claim 15, wherein said pressurizing gas supply opening is formed in a pressurizing gas supply nozzle of a detachable type.

18. An apparatus for vulcanizing an elastomer product comprising a vulcanizing chamber formed in a mold means; means to place a preform of said elastomer product in said mold means; means to supply steam at an elevated pressure to said vulcanizing chamber to heat and pressurize said elastomer product until said elastomer product reaches a prespecified temperature or for a prespecified period of time; means to stop supplying said steam; means to supply an inert pressurizing gas, at a pressure not lower than said steam supply pressure, to said vulcanizing chamber until the end of a heating period; means to maintain the temperature of said elastomer product at said prespecified temperature during said heating period; further including a steam supply opening at an upper position of the center of said vulcanizing chamber to blow said steam toward a lower region of said vulcanizing chamber; and a pressurizing gas supply opening at a lower position of the center of said vulcanizing chamber, for blowing said pressurizing gas toward an upper region of said vulcanizing chamber.

19. An apparatus as claimed in claim 18 for vulcanizing an elastomer product, wherein said upper position of the center of said vulcanizing chamber is an upper bladder holder portion.

20. An apparatus as claimed in claim 18 for vulcanizing an elastomer product, wherein said lower position of the center of said vulcanizing chamber is a bagwell or a support for a lower bladder holder.

21. An apparatus as claimed in claim 18 for vulcanizing an elastomer product, wherein said steam supply opening is formed in a steam supply nozzle of a detachable type.

22. An apparatus as claimed in claim 18 for vulcanizing an elastomer product, wherein said pressurizing gas supply opening is formed in a pressurizing gas supply nozzle of a detachable type.

* * * * *